United States Patent [19]
Howes

[11] Patent Number: 5,113,398
[45] Date of Patent: May 12, 1992

[54] SELF-HEALING DATA NETWORK AND NETWORK NODE CONTROLLER

[75] Inventor: Nicholas J. Howes, Reston, Va.

[73] Assignee: Shackleton System Drives Corporation, Reston, Va.

[21] Appl. No.: 360,024

[22] Filed: Aug. 1, 1989

[51] Int. Cl.⁵ .......................................... G06F 11/20
[52] U.S. Cl. .................................. 371/11.2; 371/8.2; 370/16; 340/827
[58] Field of Search ...................... 371/8.2, 11.2, 11.1, 371/8.1, 20.6, 20.1; 375/38, 40, 100; 370/16, 16.1, 85.12, 100.1; 455/8; 340/825.01, 827, 825.03

[56] References Cited

U.S. PATENT DOCUMENTS

| | | | |
|---|---|---|---|
| Re. 28,958 | 9/1976 | Zafiropulo et al. | 340/147 SC |
| 3,596,049 | 6/1966 | Rizzotti | 455/603 |
| 4,144,410 | 3/1979 | Flickinger et al. | 179/15 AL |
| 4,190,821 | 2/1980 | Woodward | 340/147 SC |
| 4,195,351 | 3/1980 | Barner et al. | 364/900 |
| 4,320,508 | 3/1982 | Takezoe | 371/22 |
| 4,354,267 | 10/1982 | Mori et al. | 371/11 |
| 4,380,061 | 4/1983 | Mori et al. | 370/16 |
| 4,390,984 | 6/1983 | Sugiura et al. | 370/88 |
| 4,435,704 | 3/1984 | Hashimoto et al. | 340/825.01 |
| 4,446,551 | 5/1984 | Seo | 370/16 |
| 4,501,021 | 2/1985 | Weiss | 455/601 |
| 4,504,945 | 3/1985 | Kyo | 370/88 |
| 4,506,357 | 3/1985 | Nakayashiki | 370/16 |
| 4,507,777 | 3/1985 | Tucker et al. | 370/16 |
| 4,519,070 | 5/1985 | Bell | 370/88 |
| 4,527,270 | 7/1985 | Sweeton | 371/11 |
| 4,538,264 | 8/1985 | Bahr et al. | 371/8 |
| 4,539,655 | 9/1985 | Trussell et al. | 364/900 |
| 4,542,496 | 9/1985 | Takeyama | 370/16 |
| 4,553,233 | 11/1985 | Debuysscher et al. | 370/16 |
| 4,554,659 | 11/1985 | Blood et al. | 370/88 |
| 4,567,590 | 1/1986 | Bederman | 370/86 |
| 4,573,044 | 2/1986 | McConachie et al. | 340/825.05 |
| 4,594,709 | 6/1986 | Yosue | 371/8 |
| 4,596,013 | 6/1986 | Tashiro et al. | 370/86 |
| 4,627,055 | 12/1986 | Mori et al. | 371/11 |
| 4,633,246 | 12/1986 | Jones et al. | 340/825.05 |
| 4,648,088 | 3/1987 | Cagle et al. | 370/16 |
| 4,677,615 | 6/1987 | Orimo et al. | 370/89 |
| 4,683,537 | 7/1987 | Rouse et al. | 370/16 |
| 4,696,001 | 9/1987 | Gagliardi et al. | 370/88 |
| 4,704,714 | 11/1987 | Tomizaua | 370/15 |
| 4,709,365 | 11/1987 | Beale et al. | 371/11 |

(List continued on next page.)

OTHER PUBLICATIONS

"A Systematic Approach to the Design of Digital Bussing Structures"; Fall Joint Computer Conference 1972; pp. 719–740; Thurber et al.

International Standard 150 7498; Published by the American National Standards Association.

"Local Area Networks"; *Computer*; pp. 242–247; Graube and Mulder; Oct. 1984.

"Demand Grows for Integrated Open Networks"; *Computer Design*; pp. 51–61; Mokhoff; Sep. 1, 1985.

"Local Area Networks Tying Computers Togethers: The Productivity Connection"; *Creative Computing*; pp. 70–77; Lockwood; Oct. 1985.

"VTI Tools: The Expert Advantage in ASIC Design"; VLSI Technology, Inc.; 1986.

"Fiberoptic Network Standard Delivers Speed and Reliability"; Computer Design; pp. 75–79; Ullal and McCool; Oct. 1, 1987.

"Gl Releases MUX Scheme for Class A,B,E"; *Automotive Electronics News*; p. 44; Feb. 27, 1989.

*Primary Examiner*—Robert W. Beausoliel
*Attorney, Agent, or Firm*—Mary Helen Sears; Stephen Glazier

[57] ABSTRACT

A self-healing data network and network node controller. Data transmission of data cells to form message permitting self-clocking operation of each node and elastic buffering implemented to allow receipt of messages without regard to the phase of messages allows asynchronous operation of each node relative to other nodes. Fault detection and network self-healing are performed by each node independently of other nodes.

27 Claims, 20 Drawing Sheets

U.S. PATENT DOCUMENTS

| | | | |
|---|---|---|---|
| 4,727,477 | 2/1988 | Gavril | 364/200 |
| 4,745,597 | 5/1988 | Moraan et al. | 370/87 |
| 4,768,190 | 8/1988 | Giancarlo | 370/86 |
| 4,774,703 | 9/1988 | Force | 371/8.2 X |
| 4,797,903 | 1/1989 | Itoh | 371/8.2 X |
| 4,815,069 | 3/1989 | Nakayashiki | 370/16 |
| 4,816,823 | 3/1989 | Polkinghorne | 370/110.1 X |
| 4,819,225 | 4/1989 | Hochstein | 370/16 |
| 4,826,278 | 5/1989 | Gartside et al. | 350/96.23 |
| 4,829,512 | 5/1989 | Nakai et al. | 370/16 |
| 4,839,885 | 6/1989 | Wu | 370/4 |
| 4,845,657 | 7/1989 | Yokota et al. | 364/900 |
| 4,864,492 | 9/1989 | Blakely-Fogel et al. | 364/200 |
| 4,873,666 | 10/1989 | Lefebure | 365/189.07 |
| 4,873,667 | 10/1989 | Geadah et al. | 365/189.07 |
| 4,873,681 | 10/1989 | Arthurs et al. | 370/3 |
| 4,876,718 | 10/1989 | Citta et al. | 380/42 |
| 4,887,256 | 12/1989 | Nakayashiki et al. | 370/16 |
| 4,894,819 | 1/1990 | Kondo et al. | 376/4 |
| 4,903,261 | 2/1990 | Baran et al. | 370/94.2 |
| 4,905,229 | 2/1990 | Kato | 370/85.7 |
| 4,905,233 | 2/1990 | Cain et al. | 370/94.1 |
| 4,908,784 | 3/1990 | Box et al. | 364/569 |
| 4,912,461 | 3/1990 | Cenzano et al. | 340/825.52 |
| 4,922,438 | 5/1990 | Ballweg | 370/85.15 |
| 4,937,811 | 6/1990 | Harris | 370/16.1 X |
| 4,939,721 | 7/1990 | De Bosio | 370/60 |
| 4,947,389 | 8/1990 | Eng et al. | 370/85.12 |
| 4,953,083 | 8/1990 | Takata et al. | 364/200 |

| Range | Type | Binary | Rule |
|---|---|---|---|
| 00 - 0F | Alpha Messages | 0000 0000 <br> 0000 1111 | Always Accepted |
| 10 - 6F | Beta Messages | 0001 0000 <br> 0110 1111 | Accepted Subject to Addressing |
| 70 - 7F | Gamma Messages | 0111 0000 <br> 0111 1111 | Always Accepted and Retransmitted |
| 80 - FF | Delta Messages | 1000 0000 <br> 1111 1111 | Always Retransmitted; Accepted subject to Global Enables. |

FIG. 3B

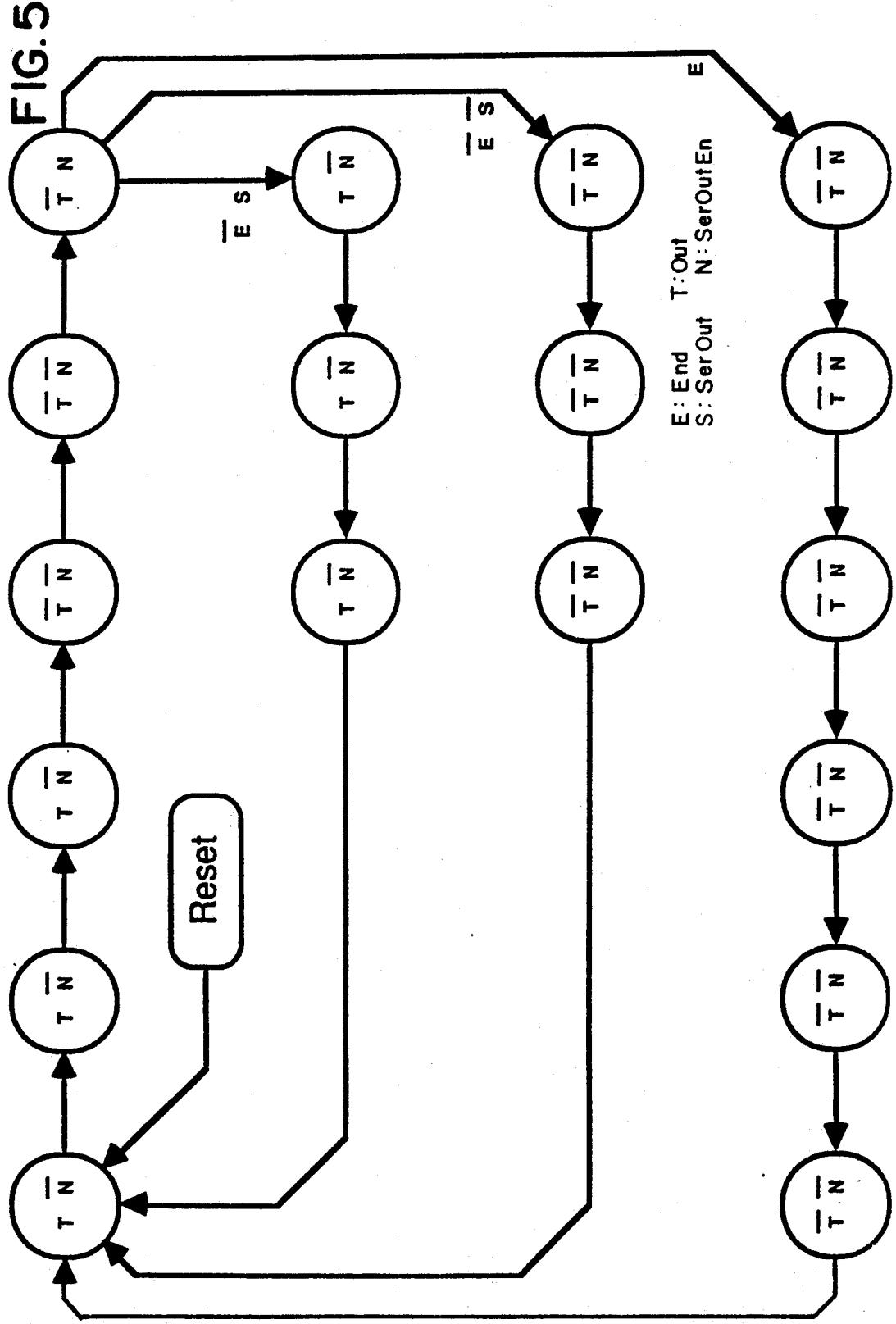

S: Serin
E: SerinEn
T: Start          N: Input (e.g. Power Failure)

SELF-HEALING DATA NETWORK AND NETWORK NODE CONTROLLER

BACKGROUND OF THE INVENTION

Control systems for industrial processes involve the monitoring of process variables and the actuation of process control devices to alter or maintain such process variables. Process variables include temperature, flow, mixture, etc. which can be affected by a drive unit which regulates, for example, a heater, a valve, or the addition of a component. Such process controls are usually distributed throughout a plant or along an assembly line. Therefore, individual stations for monitoring and/or actuation of process control devices are employed. In order to assure that processes are properly controlled, the individual stations must be able to communicate with each other and are frequently connected in a network. The loss of communication between stations or the loss of individual stations can adversely affect the process being controlled, resulting in loss of control of the process or damage to the plant. Because these processes are frequently dynamic and involve rapid or instantaneous changes, it is important that information be passed between stations in real time. Equally important, station or connector failures should be detected rapidly and corrective action taken, such as process shutdown or maintenance of the status quo. Maintaining of the network connection by self-healing is a desirable feature.

Similarly, communications systems involve the sending and receiving of signals between stations, frequently in real time. It is also desirable that a communication network fault be detected and corrective action, such as self-healing, initiated.

The sending and receiving of process control or communication signals often occurs in an environment containing electromagnetic fields which can interfere with the transmission of signals. A typical process control or communication system would involve the use of copper wire connectors for process controllers which are arranged in a bus, a ring or a star configuration. Frequently, there are one or more master stations, which control the remaining slave stations. In such an arrangement, failure of a master station can result in failure of the entire network. Alternatively, networks comprised of peer stations can be constructed. However, all peer networks involve problems associated with synchronization of the data signals and the control of the network to avoid data conflicts. To deal with station or connector failures, a typical solution is to send and receive failure signals and acknowledgment signals, with networks having slave stations dependent on the master stations for configurational control or self-healing of the network.

Many existing systems require synchronization of transmissions between the individual stations, typically implemented by phase-lock loops. Some form of monitoring of data on the network is required in order to avoid conflicts with data being introduced to or removed from the network.

SUMMARY OF THE INVENTION

The present invention is a Real Time Network ("RTN") containing a network controller designed to interface with a host microprocessor. The RTN is comprised of nodes connected to form a network. Each node includes four major features: (1) data transmission of data cells which form messages in a way which allows each node to be self-clocking relative to the other nodes in the network and (2) elastic buffering implemented to allow for receipt of messages from other nodes without regard to the phase of the messages, thereby allowing for asynchronous operation of each node relative to the other nodes; (3) fault detection along the network by each node, independent of the other nodes; and (4) network self-healing performed independently by individual nodes on either side of a fault by switching to an alternate ring or by loopback if a fault is detected in the ring.

In the preferred embodiment, the RTN is comprised of fiber optic medium which includes fiber optic cables arranged in two parallel data pathways, a forward pathway and a reverse pathway, the pathways connected to individual nodes or stations. When these fiber optic cables are connected to the individual nodes, the data pathways and nodes form two parallel ring networks. Each node has fiber optic medium opto-electric converters, receivers, transmitters and electro-optical converters. Each node receives, decodes, stores, processes, encodes and retransmits digital data signals which are in the form of messages. (Analog signals could be transmitted between nodes over appropriate non-optical connectors, provided that analog-to-digital converters are used on incoming signals and digital-to-analog converters are used for outgoing signals.) Each node contains its own Application Specific Integrated Circuit ("ASIC") which is designed to interface with a host microprocessor such as, e.g., an Intel 8096, manufactured by Intel, Inc., Santa Clara, Calif. or a Motorola 68HCII, manufactured by Motorola Semiconductor Products, Inc., Austin, Texas. The ASIC performs the four functions described above. Messages are sent from node to node along the network, with each node acting as a repeater. In the preferred embodiment, the messages are in the form of fixed format, fixed length data packets. (For example, 72 bit messages, having 12 bit source addresses and 12 bit destination addresses are implemented in the preferred embodiment.) These messages are assembled from data bits called data cells and later disassembled back into cells. An originating or source node places a message on the network; the message circulates on the network, being received and retransmitted by each node, until it reaches its destination (or destinations, if sent to more than one other node), where it is removed from the network by the destination node(s). The ASIC permits each node to operate asynchronously of the other nodes by employing elastic buffering in conjunction with a specific data cell format. The data cells have their meaning determined by the number of clock intervals between a transition from a high state (greater than 3.5 volts) to a low state (less than 1 volt) and back again, wherein the meaning is the same whether the number of clock intervals is n, n−1 or n+1, where n is an integer multiple of three or more. This data cell format permits each node to be self-clocking, thereby operating without having its internal clock synchronized to the internal clocks of the other nodes, provided the operating frequencies of the clocks of each node in the network are within approximately one percent. Elastic buffering of incoming data from the forward ring is performed by a combination of registers which reduce the amount of space required for this function on the ASIC chip. Elastic buffering is performed on incoming data from the reverse ring by means of registers which are controlled by Boolean algebra state machine logic elements. The elastic buffering permits messages received by a node to be out of phase with messages transmitted by a node. Elastic buffering permits message level synchronization. The combined effect of the data cell format and the elastic buffering is the asynchronous operation of each node relative to others in the network. The ASIC employs a timer for both the forward and reverse ring to detect when data is not being received. Upon a timer timing out, a fault in the affected ring is detected and the ASIC initiates the setting of switches for the rerouting of data through the ASIC. Self-healing of the RTN is made possible by switches which effect loop-back through the ASIC and hence through the individual nodes. This fault detection and self-healing is independent of other nodes.

The present invention has been designed as an inexpensive, reliable, high-speed and flexible way to interconnect intelligent devices in an industrial environment. The RTN can be used in three major configurations: (1) As a stand-alone network, the RTN replaces all the signal wiring in a conventional drive, automotive control, aerospace control or communication system. The RTN allows real time information to be passed between drives, input-output devices, process controllers, operator stations, etc. In this configuration, the RTN can be greatly expanded to interconnect a large number of devices. (In the preferred embodiment, for example, the number of devices is determined by the 12 bit source address and 12 bit destination address, which permits $2^{12} = 4096$ devices.) (2) Through the use of hardware and software connecting individual RTNs, a number of RTNs may be connected into a complex multinet. In this configuration, nodes may obtain the same session-level services as on a stand-alone RTN. (3) Through the use of gateway hardware and software, the RTN may be connected to dissimilar networks such as MAP (Manufacturing Automation Protocol, developed by General Motors), MAP-EPA (MAP-Enhanced Performance Architecture, also developed by GM), TOP (Technical and Office Protocols, developed by Boeing Co.), Ethernet (developed by Xerox Corp.) and EIBYSYNCH (Binary Synchronous Communications, developed by Eurotherm International, conforming to ANSI-X3.28-2.5-B1). In this configuration, nodes on one network may obtain application-level services from nodes on the other network.

The RTN permits the replacement of copper wires with optical fibers to provide a sophisticated communication system having added functionality without added cost. The RTN can be used to replace Ethernet, ARCNET (developed by Datapoint Corp.) or MAP at about one fourth of the cost. The RTN is suited for data communication, automotive, rail and aerospace control systems, as well as industrial process control.

The RTN controllers provide the capability of their host processors at each node to control machines or devices attached to the node or machines or devices attached to other nodes. Because of the large number of nodes which can be used and the use of fiber-optic connections, the RTN can be used for data communications and process control of both nearby and remote stations.

The invention in its preferred form provides a fiber-optic data network and individual nodes, each of equal status and capabilities, for connection to the network for the transmission of data. This network is particularly adaptable for use in industrial process control. However, the RTN could be configured without fiber optic media and use copper wires and direct electrical signals, thereby avoiding the need to convert from electrical to optical and back. The individual nodes provide for asynchronous transmission and receipt of data between nodes. The individual nodes are capable of determining when a fault has occurred in the network and of individually switching internally to effect network self-healing. To effect self-healing, the network is configured as a ring network, with a backup ring. The backup ring is used in the event of a node failure or a failure in the primary ring. The nodes could be used in networks having configurations other than a ring, such as a star configuration with two rings going from each node to the control (hub) node of the star. The connectors are fiber-optic lines, with the nodes each having opto-electric and electro-optical converters. Thus, the network is not susceptible to electromagnetic interference.

The receipt, decoding, storage, transmission of data to host computers at each node, and encoding and transmission of data back to the network is effected by an Application Specific Integrated Circuit (ASIC). However, individual logic circuit components of standard design and commercial availability could also be configured to perform the same function. Circuit logic and architecture is disclosed for the ASIC.

BRIEF DESCRIPTION OF DRAWINGS

FIG. 3B shows the message type field interpretation;

FIG. 5 is a state diagram of the ASIC encoder section;

DETAILED DESCRIPTION OF THE DRAWINGS, TABLES AND THE INVENTION

The present invention may be practiced in numerous embodiments. The ensuing detailed description focuses primarily upon of the preferred embodiment but points out some of the variations and modifications that are contemplated In the preferred embodiment, the Real Time Network ("RTN") controller is a logic element node, which can be connected to other logic element nodes by means of fiber optic connectors which serve as data pathways. The combination of nodes and connectors form a ring network, the Real Time Network. As envisioned, the node includes four major features: (1) data transmission of cells to form messages in a way which will allow for self-clocking operation of each node without regard for clocking relative to the other nodes and (2) elastic buffering implemented to allow for receipt of messages from other nodes without regard to the phase of the messages, thereby allowing for asynchronous operation of each node relative to the other nodes; (3) fault detection along the network by each node, independent of the other nodes; and (4) network self-healing performed independently by individual nodes on either side of a fault by switching to an alternate ring or by loopback if a fault is detected in the ring. The RTN controller can also be used in networks having configurations other than a ring, such as a star configuration with two rings connecting each outer node to a central node, thereby permitting self-healing if an outer node or a ring fails. In such a configuration, automatic jumpering is possible by connecting one node to another already in a network, with such prior-connected node effecting self-healing if the newly connected node is removed.

RTN Protocols

Figure 1:
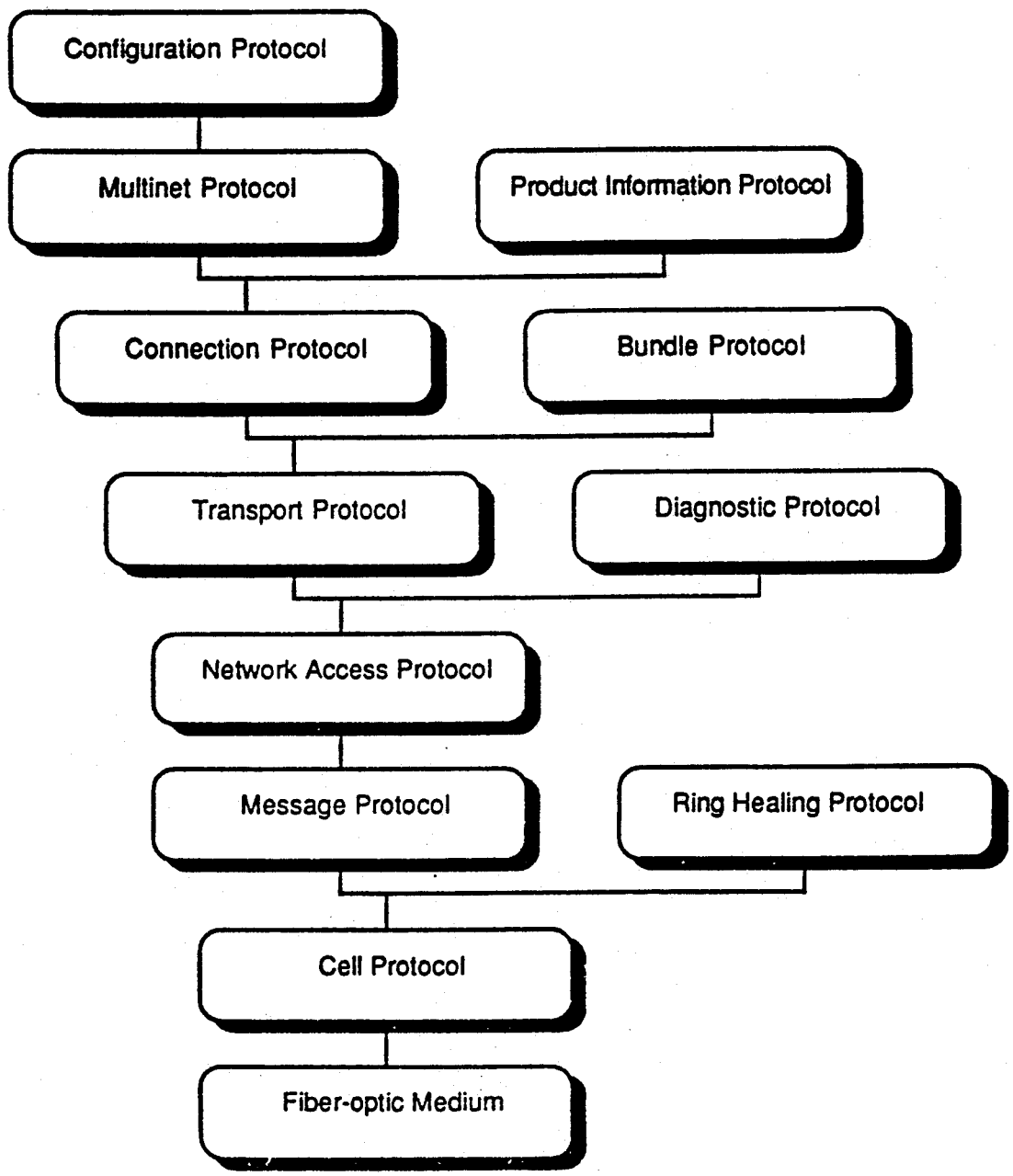
FIG. 1 illustrates the RTN protocols which follow the ISO Open System Interconnection model 7498 framework.

As shown in FIG. 1, the RTN follows the guidelines of the Open Systems Interconnection ("OSI") model 7498 of the International Organization for Standards ("ISO"). The ISO-OSI is a seven-layered set of rules called protocols, two of which are implemented by the physical and logical elements of the RTN. The OSI protocols envisioned to be implemented by the RTN are the Physical Layer (layer 1) and the Data Link Layer (layer 2). In addition, the host processor for the ASIC implements the Transport Layer (layer 4), the Session Layer (layer 5) and the Presentation Layer (layer 6). The Network Layer (layer 3) is not implemented. Not implementing the Network Layer results in easily predictable times between message delivery between nodes.

The RTN is preferably organized, both logically and physically, as a ring network, where the nodes are connected by simplex, point-to-point, fiber-optic data links. Messages are placed on this ring and move around it until they reach their destination, where they are removed.

In keeping with the ISO Open Systems Interconnection model 7498 guidelines, the exchange of messages on the RTN is by way of various layers of protocols: The Fiber-optic medium is the lower sublayer of the Physical Layer. As used herein, fiber optic medium is the hardware means for connecting individual nodes together and includes both fiber optic cable and electro-optical equipment. The Fiber-optic Medium is comprised of transmitting hardware which converts electrical signals into light pulses which are coupled onto a fiber optic cable and receiving hardware which detects the light pulses coming from the cable and converts them back into electrical signals. Thomas and Betts (Raritan, NJ) fiber-optic equipment, such as the 92915-T-DD fiber-optic transmitter, 93902 plastic fiber-optic cable, 92910 cable termination plugs and 92915-R-HS fiber-optic receiver are suitable for use as the fiber optic medium. The ASIC implements the remainder of the Physical and the Data Link Layer of OSI and supports the layers above by interconnection with the host processor. The RTN Cell Protocol ("RCP") is the upper sublayer of the Physical Layer; it provides the services of cell transmission and reception including encoding, decoding and synchronization. The RTN Message Protocol ("RMP") is the lower sublayer of the Data Link Layer; it provides the service of message transmission and reception including message assembly from cells, message disassembly into cells, message synchronization, error detection and limited message interpretation. The Ring Healing Protocol manages a second, redundant ring which provides a degree of fault tolerance in the event of a link or node failure. The Network Access Protocol is the upper sublayer of the Data Link Layer; it provides for access to the network for new messages, delivery of messages to their destination(s) and removal of corrupted messages from the network.

The Transport Protocol, Diagnostic Protocol, Connection Protocol, Bundle Protocol, Multinet Protocol, Product Information Protocol and Configuration Protocol are implemented by the host processor.

RTN Data Transmission

Figure 2:
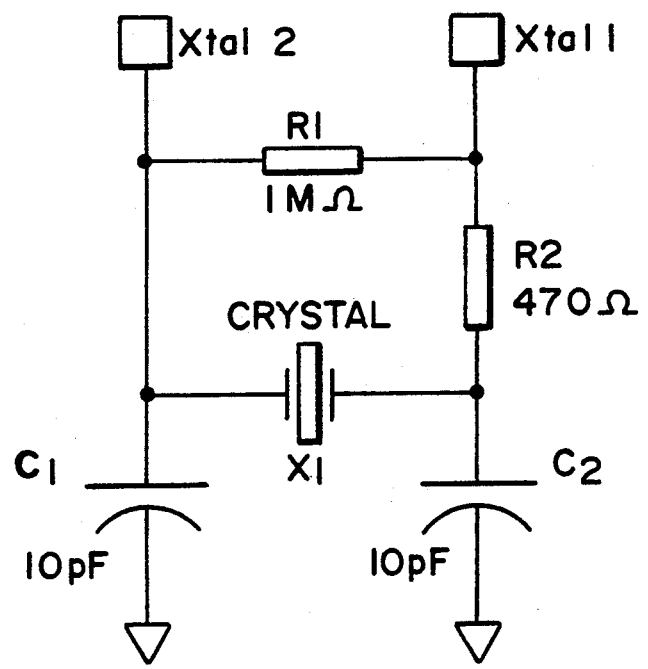
FIG. 2 is a circuit diagram for a clock source for use with an on chip oscillator.

Each ASIC of the RTN requires a clock to sequence its internal operations. This clock may be set at any frequency from DC (0 Hz) to 18 MHz; however, all the clocks on the network must run within 1% of the same frequency. The clocks on different ASIC do not need to be synchronized, however. The ASIC may be driven from an external TTL clock source or a quartz crystal may be used with an on chip oscillator. A circuit for use with the on chip oscillator is shown in FIG. 2. The RTN ASIC clock oscillator is a positive-reactance feedback oscillator which is comprised of a high gain inverting amplifier in the ASIC, a DC biasing resistor, R1, a quartz crystal, X1, and two load capacitors, C1 and C2. The resistor, R2, is a drive limiting resistor which prevents overstressing the crystal.

Figure 2A:
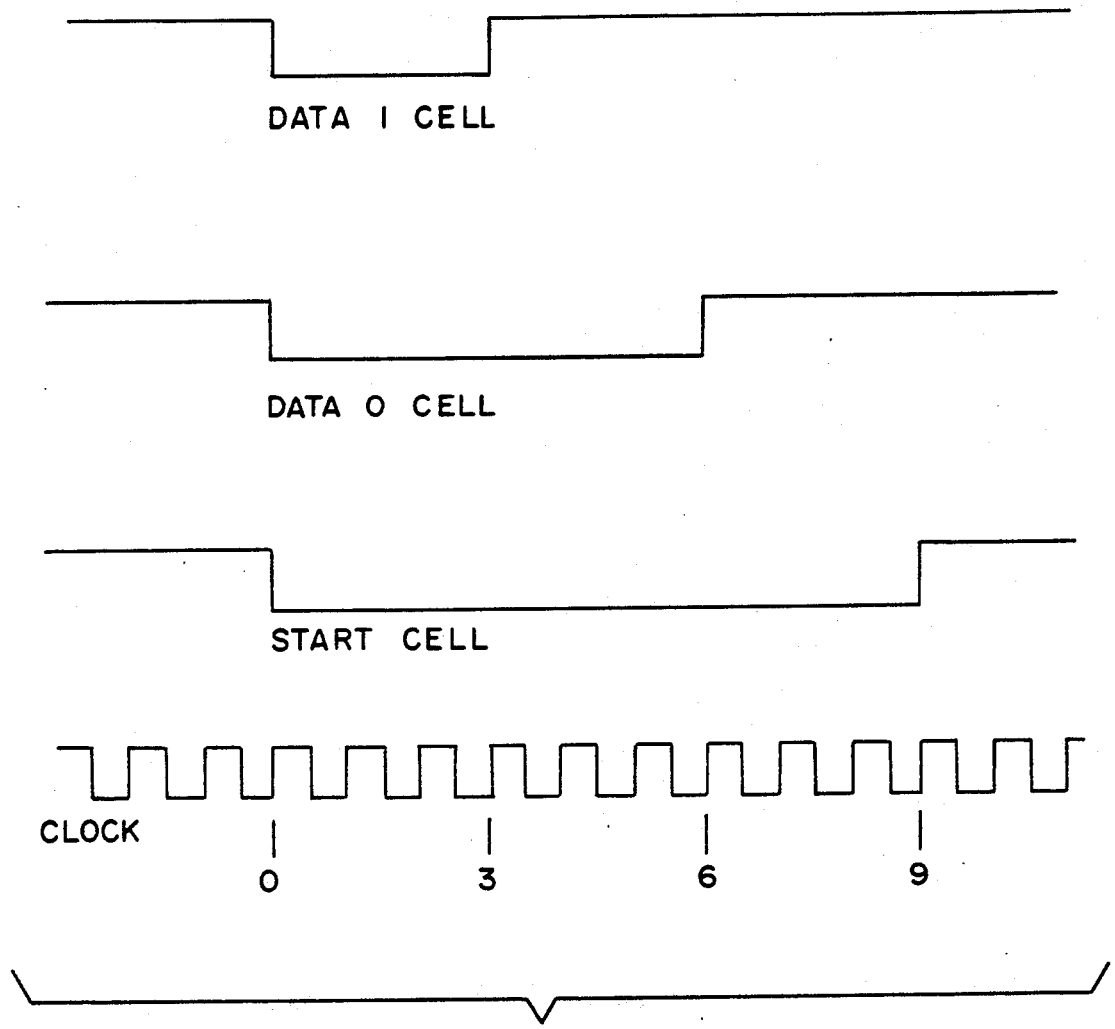
FIGS. 2A-2I illustrates data cells and their clock intervals.

In the preferred embodiment, RTN data is transmitted as 72 bit messages, with each bit being a data cell. As shown in FIG. 2A, those messages are made up of data 0, data 1 and start cells, the values of which are determined by the time interval (number of node clock times) between the transition from high (1) to low (0) values and back again to high. Each message begins with at least two start cells. These high or low values are set for three clock times. By using three clock times, a sequence of $n-1$, $n$ or $n+1$ clock times will be interpreted as identical bits, wherein n is an integer multiple of 3. This permits nodes to communicate without their internal clocks being synchronized because a low period of 2, 3 or 4 clock times is recognized as a data 1, a low period of 5, 6 or 7 clock times is recognized as a data 0, and a low period of 8, 9 or 10 clock times is recognized as a data start signal. Thus disparities between transmitted signal timing and the timing in the receiving node do not alter data meaning.

Although the preferred embodiment uses multiples of three clock times, other numbers of clock times are contemplated. For instance, the use of four clock times would also permit the detection of clock matching errors. Of course, the use of a different multiple of clock times from three would alter the number of variations which have the same meaning. For example, for five clock times, $n-2$, $n-1$, $n$, $n+1$, $n+2$ bits would all have the same meaning. In addition, other data cells than zero, one and start can be envisioned. Such data cells could be implemented by adjusting the length of the low period. This would, however, require closer matching of the operating frequencies of the clocks between nodes.

Figure 2B:
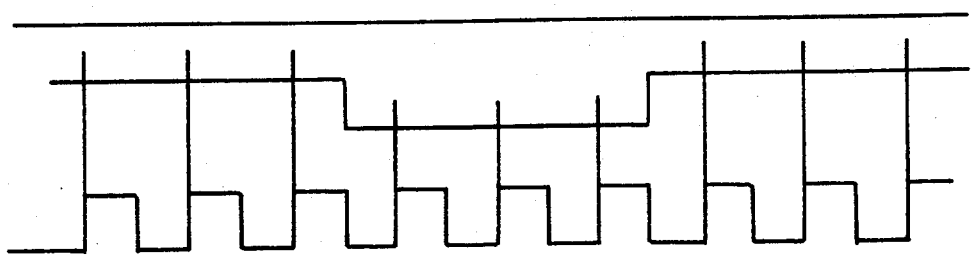

FIG. 2B shows the case in which the transmit and receive clocks are synchronized and no metastability conditions exist. (The top waveform is a data 1 signal; the bottom waveform is the receive clock and data is sampled on the rising edge of the clock). In this case, the low-to-high transition occurs 3 clock times after the high-to-low transition. In the discussion that follows, it is assumed that the metastability conditions are not propagated into the circuitry of the node, but are resolved in a random logic state. This resolution into a random logic state is performed by a synchronizer at each node.

Figure 2C:
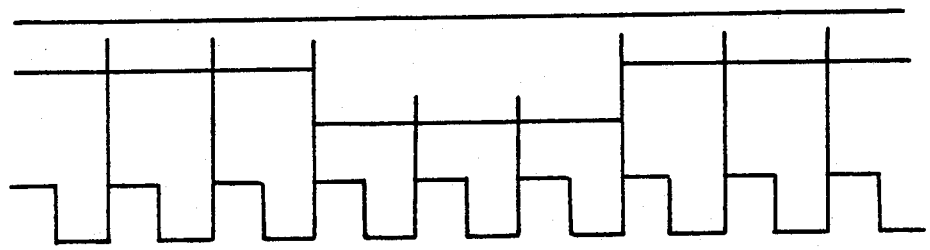

FIG. 2C shows the case in which the transmit and receive clocks are synchronized and metastability conditions exist. In this case, the metastability conditions introduce random values at both the high-to-low transition and the low-to-high transition, and four possibilities must be considered:

(1) The first metastability condition is received as a low and the second metastability condition is received as a low. Hence, the low-to-high transition occurs 4 clock times after the high-to-low transition.

(2) The first metastability condition is received as a low and the second metastability condition is received as a high. Therefore, the low-to-high transition occurs 3 clock times after the high-to-low transition.

(3) The first metastability condition is received as a high and the second metastability condition is received as a low. In this case, the low-to-high transition occurs 3 clock times after the high-to-low transition.

(4) The first metastability condition is received as a high and the second metastability condition is received as a high. The result is that the low-to-high transition occurs 2 clock times after the high-to-low transition.

Thus, in this case, the low-to-high transition occurs either 2, 3, or 4 clock times after the high-to-low transition.

Figure 2D:
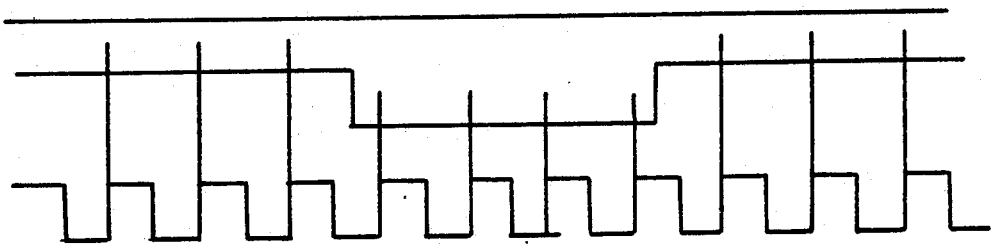

FIG. 2D shows the case in which the receive clock runs faster than the transmit clock and no metastability conditions exist. In this case, the low-to-high transition occurs 4 clock times after the high-to-low transition.

Figure 2E:
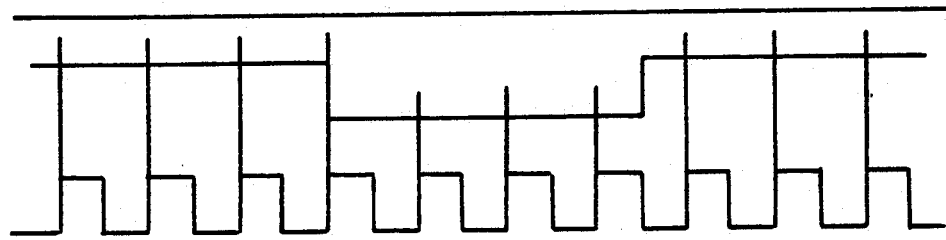

FIG. 2E shows the case in which the receive clock runs faster than the transmit clock and a metastability condition exists on the high-to-low transition. In this instance, the metastability condition introduces a random value, and two possibilities must be considered:

(1) The metastability condition is received as a low; resulting in the low-to-high transition occurring 4 clock times after the high-to-low transition.

(2) The metastability condition is received as a high. Therefore, the low-to-high transition occurs 3 clock times after the high-to-low transition.

Thus, in this case, the low-to-high transition occurs either 3 or 4 clock times after the high-to-low transition.

Figure 2F:
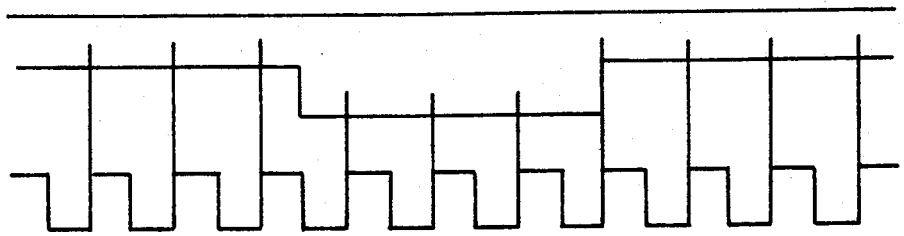

FIG. 2F shows the case in which the receive clock runs faster than the transmit clock and a metastability condition exists on the low-to-high transition. In this case, the metastability condition introduces a random value, and two possibilities must be considered:

(1) The metastability condition is received as a low with the result that the low-to-high transition occurs 4 clock times after the high-to-low transition.

The metastability condition is received as a high. Therefore, the low-to-high transition occurs 3 clock times after the high-to-low transition.

In this case, the low-to-high transition occurs either 3 or 4 clock times after the high-to-low transition.

Figure 2G:
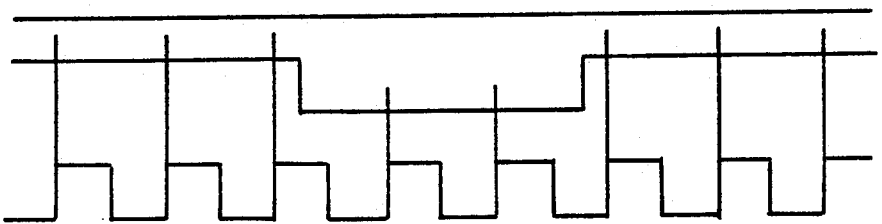

FIG. 2G shows the case in which the transmit clock runs faster than the receive clock and no metastability conditions exists. In this instance, the low-to-high transition occurs 2 clock times after the high-to-low transition.

Figure 2H:
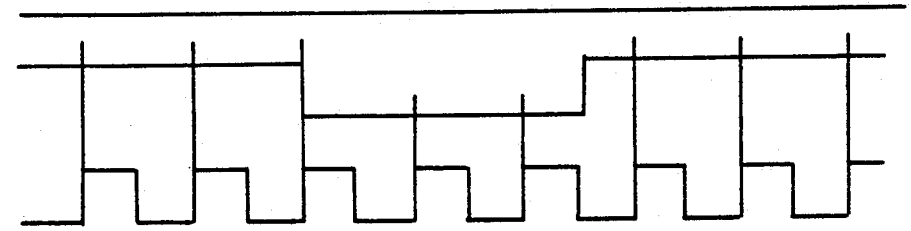

FIG. 2H shows the case in which the transmit clock runs faster than the receive clock and a metastability condition exists on the high-to-low transition. In this case, the metastability condition introduces a random value, and two possibilities must be considered:

1) The metastability condition is received as a low. Hence, the low-to-high transition occurs 3 clock times after the high-to-low transition.

(2) The metastability condition is received as a high. Therefore, the low-to-high transition occurs 2 clock times after the high-to-low transition.

In this case, the low-to-high transition occurs either 2 or 3 clock times after the high-to-low transition.

Figure 2I:
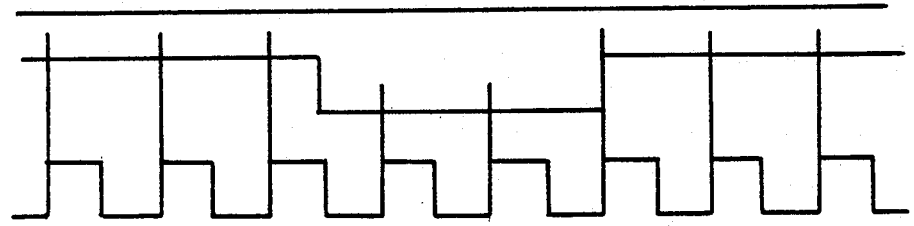

FIG. 2I shows the case in which the transmit clock runs faster than the receive clock and a metastability condition exists on the low-to-high transition. In this instance, the metastability condition introduces a random value, and two possibilities must be considered.

(1) The metastability condition is received as a low. The low-to-high transition occurs 3 times after the high-to-low transition.

(2) The metastability condition is received as a high. Hence, the low-to-high transition occurs 2 clock times after the high-to-low transition.

Thus, in this case, the low-to-high transition occurs either 2 or 3 clock times after the high-to-low transition.

This examination of the asynchronism and metastability conditions that exist for a data 1 cell shows that a cell which has 3 clock times between its high-to-low and low-to-high transitions will be received as having either 2, 3 or 4 clock times between its high-to-low and low-to-high transitions. Since the metastability conditions occur only at the transitions between levels, these results may be generalized to show that, assuming the transmit and receive clocks are well matched, a sequence of n identical bits will be received as $n-1$, n or $n+1$ bits.

As described later herein, in order to avoid data conflicts, an elastic buffer in the ASIC is provided. The elastic buffer also allowed individual nodes to operate out of phase with each other. Because the use of elastic buffering along with the data cell structure accommodates asynchronicity, the RTN does not require the use of phase lock loops.

Figure 3A:
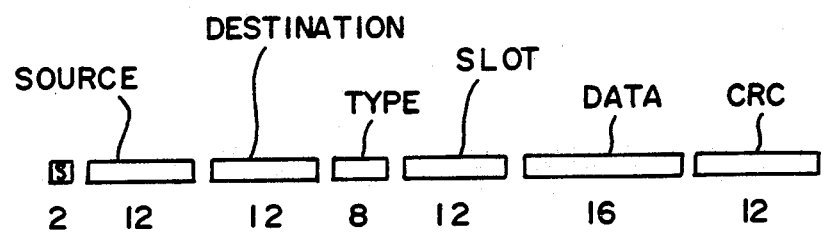
FIG. 3A illustrates message configuration of data cells.

In the preferred embodiment, messages are of a fixed length of 72 data cells and 2 start cells, as illustrated in FIG. 3A.

The source field (bits 1–12, following the 2 start cells) contains the address of the source node of the message on the network. The destination field (bits 13–24) contains the address of the destination node of the message on the network. The type field (bits 25–32) contains an identification code for the message. The type field is used by RMP and higher-level protocols to determine how a message should be interpreted. RMP only distinguishes between alpha, beta, gamma and delta messages, (described below) as illustrated in FIG. 3B. The slot field (bits 33–44) contains the slot number of the node.

Slots are used as pigeonholes for data (in most cases they are directly attached to a control parameter in the node). The data field (bits 45–60) contains a 16-bit data word. The data contained in this field varies as a function of the message type. The Cyclic Redudancy Check ("CRC") field (bits 60–72) contains a 12-bit sequence of bits which is used to check the integrity of the received message.

While messages of 72 bit length and data cells of 3, 6 or 9 clock times are used in the preferred embodiment, other message and cell lengths are contemplated and can be implemented for the present invention.

The CRC algorithm uses the standard CRC-12 polynomial:

$$G(x) = x^{12} + x^{11} + x^3 + x^2 + x + 1$$

where:
M(x) is the binary polynominal formed from the first 60 bits of the message;
R(x) is the remainder after dividing M(x) by the generating polynomial G(x);
Q(x) is the quotient after dividing M(x) by the generating polynomial.

When transmitting, the 60 bits corresponding to the coefficients of M(x) are shifted out followed by the 12 bits corresponding to the coefficients of R(x). This yields a 72 bit message corresponding to a polynomial which is exactly divisible by G(x). When receiving, the entire 72 bit message (M(x) followed by R(x)) is divided by G(x). If errors were introduced into the message, the remainder from this division is non-zero.

Other error detection algorithms known in the art are contemplated, such as check sum, parity and Reed-Solomon codes. In addition other CRC polynomials are contemplated such as CRC-32.

Embodiments using different fields of different lengths are contemplated. Among the possibilities are to have a variable length data field and to use a different bit length for the CRC field and a CRC-32 algorithm.

Messages are examined by each node at its receive section. If the message is defective, it is discarded. If the address for the message is the same as the receiving station, it is stored in the node for further processing. If the message address is not the node address, it is retransmitted.

FIG. 3B illustrates the message type field interpretation. Alpha messages, having binary values ranging from 0000 0000 to 0000 1111, are always accepted by the receiving node. Beta messages having binary values ranging from 0001 0000 to 0110 1111, are accepted subject to addressing. Gamma messages, having binary values ranging from 0111 0000 to 0111 1111, are always accepted and retransmitted. Delta messages, having binary values ranging from 1000 0000 to 1111 1111, are always retransmitted but are accepted subject to global enables. Global enables are those control signals within an individual node which enable the reception of delta messages.

Application Specific Integrated Circuit (ASIC)

ASIC Design

The ASIC was designed using proprietary copyrighted software owned by VLSI Technology, Inc. (San Jose, California) which is commercially available to the public and is known and understood by those skilled in the art. The ASIC was designed using the teachings herein and the VLSI software to generate logic block diagrams and state diagrams using a graphics editor and Boolean algebra expression state machines and logic files using a text editor. This information was then used by the software to generate a netlist which was used to control the fabrication of the ASIC. The designer of the ASIC provided the means for the ASIC to perform its intended function. Thus, software such as the VLSI software can be used with the teachings herein to reproduce the design of the ASIC.

Figure 4A:
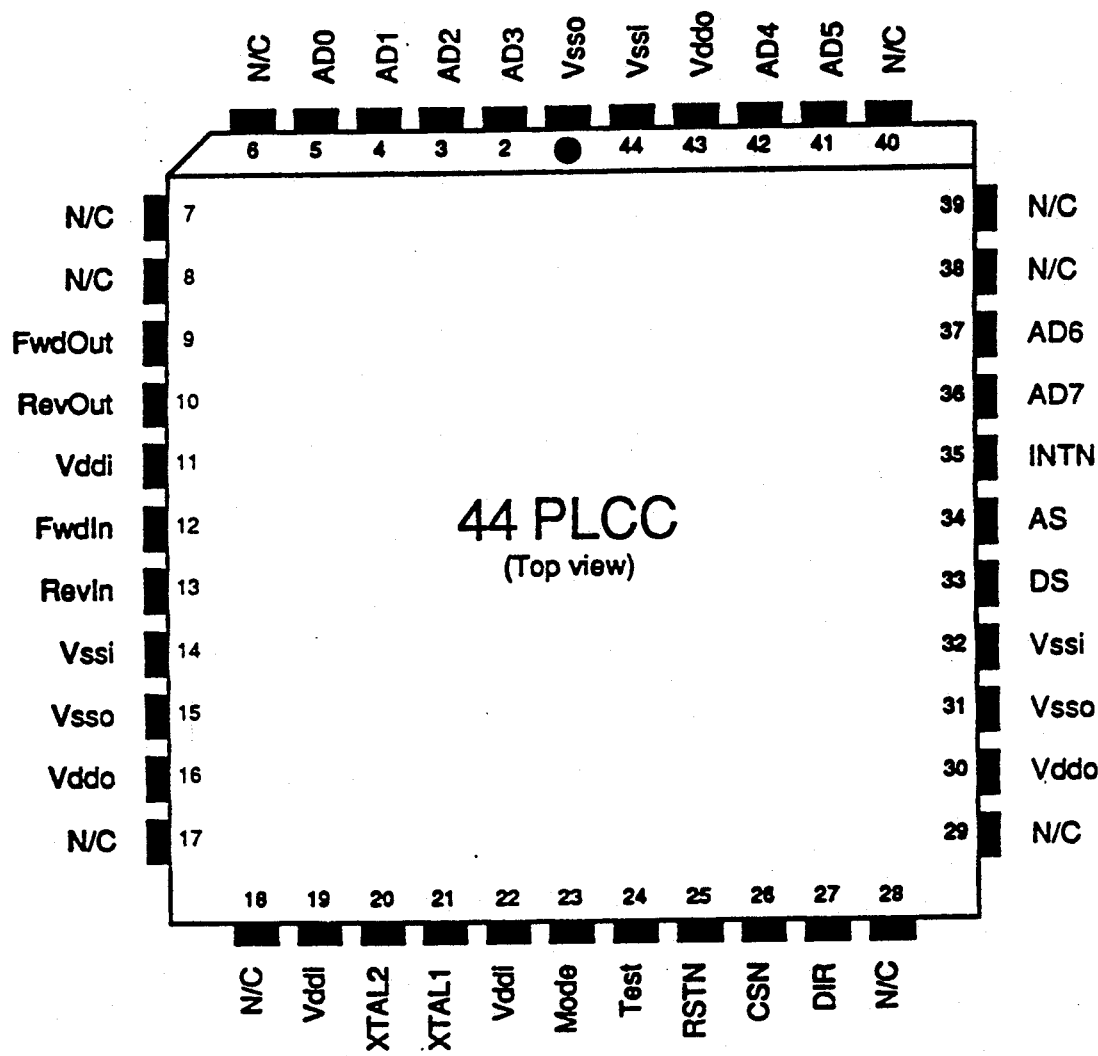
FIG. 4A is an overview showing the Real Time Network controller integrated circuit chip pin locations.

As shown in FIG. 4A, the ASIC is a 44 plastic leaded chip carrier (PLCC) having 22 signal leads, 12 leads used for power and ground and 10 dummy leads. The ASIC accepts the following inputs: Mode, the interface mode which is low (less than 0.8 volts) for interfacing with host processor chips manufactured by or compatible with Intel and high (greater than 2.4 volts) for chips manufactured by or compatible with Motorola; Test, which is used for testing the ASIC and is tied low; AS (Address Strobe), which controls the address latch; DS (Data Strobe), which operates to perform the read input function which is designated by the /RD line in Intel microprocessor host processors or the E (enable) line in Motorola microprocessor host processors; DIR (Direction), which operates to perform the read/write input function which is designated by the /WR line in Intel microprocessor host processors or the R/W line in Motorola microprocessor host processors; CSN (Chip Select), which is an active-low line enabling reading from or writing on the device; AD0-AD7 (Address-/Data Bus), which carry data, address and control information between the ASIC and the host processor and will source and sink 12 mA; FwdIn (Forward In), which is the forward input channel for the network; and RevIn (Reverse In), which is the reverse input channel for the network. The ASIC provides the following outputs: INTN (Interrupt), which is an active-low line used to interrupt the host processor and will source and sink 12 mA; FwdOut (Forward Out), which is the forward output channel for the network and will source and sink 12 mA A; RevOut (Reverse Out), which is the reverse output channel for the network and will source and sink 12 mA. XTAL1 is the input line for the crystal oscillator and XTAL2 is the output line for the crystal oscillator. Vsso designates the pad ground lines for the input/output pad ring. Vddo designates the pad power line for the input/output pad ring. Vssi designates the ground lines for the core circuitry.

Figure 4B:
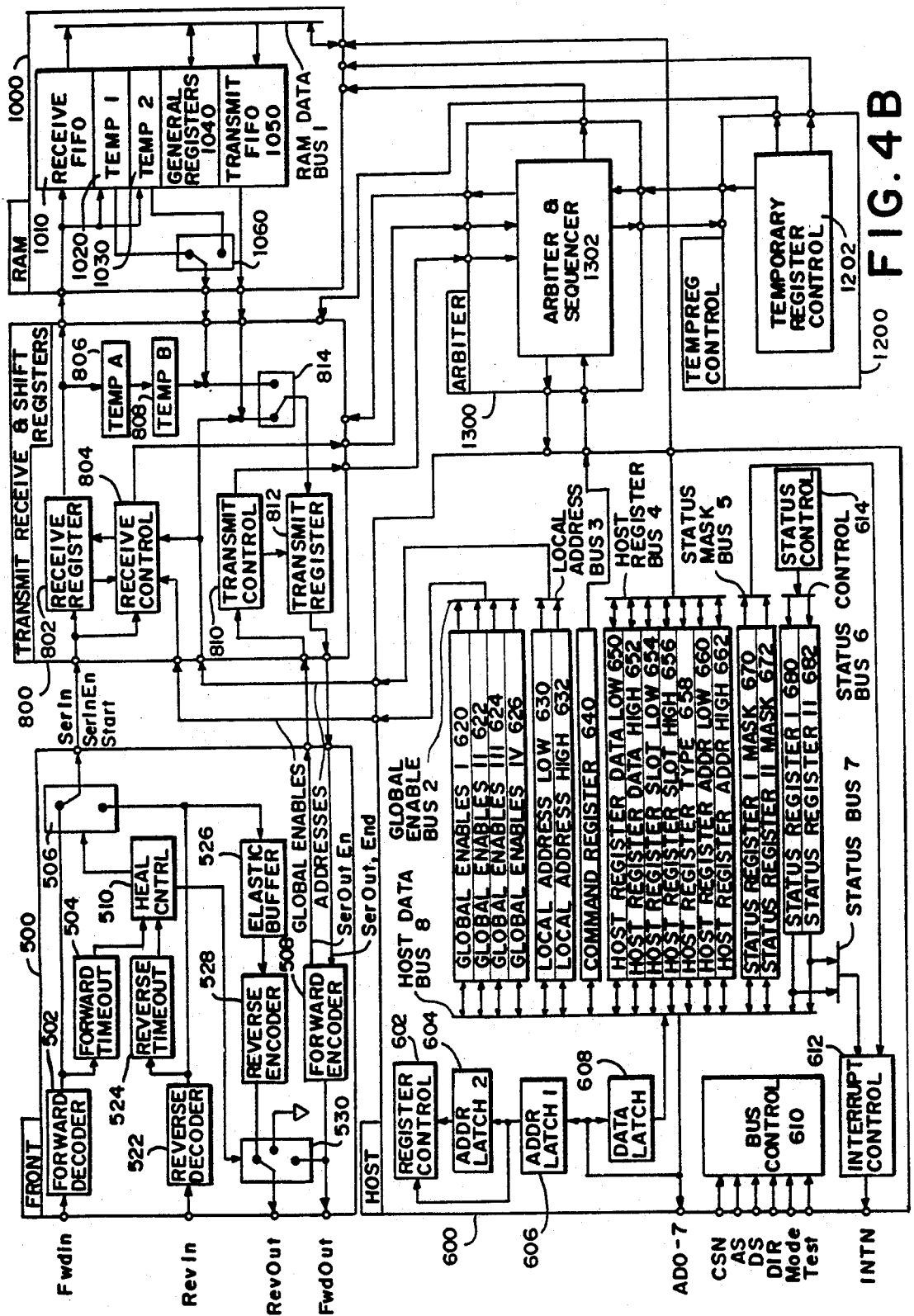
FIG. 4B is a schematic block diagram of the Real Time Network controller.

FIG. 4B is a schematic diagram which illustrates the architecture of the ASIC. The ASIC is physically configured to provide input pads, (FwdIn and RevIn), control line pads (CSN, AS, DS, DIR, Mode, Test, RST) connected by control lines having level shifters from the processor (controller) to the chip, oscillators to perform clock functions (not shown), data line pads for incoming and outgoing data pads (AD0, AD1, AD2, AD3, AD4, AD5, AD6, AD7) connected to the chip by a data in bus and data out bus, respectively, an out bus enable connected by an enable line to the pad driver, and output pads, (Fwd Out and Rev Out) and an interrupt pad (INTN). Vddi designates the power line for the core circuitry. The pads each have drivers and level shifters. In addition, the output pads have amplifier buffers. The ASIC employs CMOS technology inside the chip (less than 1 Volt=low, greater than 3.5 volts=high) and TTL technology outside the chip (less than 0.8 volts=low, greater than 2.4 volts=high). The chip is capable of operating at between DC (0MHz) to 18 MHz.

FIG. 4B illustrates the overall logic for the ASIC. Logic blocks Front, designated by numeral 500, Host 600, Transmit, Receive and Shift Registers 600, Random Access Memory (RAM) 1000, Arbiter 1300, and Temporary Register Control (TempReg Control) 1200 are shown with their various interconnections and passage of data signals between blocks.

Front 500 implements the RCP sublayer of the RTN including the self-healing feature. Host 600 contains and controls all the host-accessible registers in the chip. Transmit, Receive and Shift register block 800 controls the transmit register, the receive register and implements the transmit and receive shift register data paths as well as the address portions of the temporary registers. RAM 1000 contains the random access memory and its associated control circuitry including receive and transmit FIFO controllers and general and temporary registers TempReg Control block 1200 controls both the RAM part and the register part of the two temporary registers. Arbiter block 1300 arbitrates access to the chip's resources and provides timing signals.

As shown in FIG. 4B, Front block 500 receives as input to the chip FwdIn and RevIn signals and provides as output from the chip FwdOut and RevOut signals. Front 500 provides SerIn, SerInEn and Start signals to Receive Register 80 and Receive Control 804 of Transmit, Receive and Shift Register block 800 and SerOutEn signal to Transmit Control 810 and receives SerOut and End signals from Transmit Register 812. SerInEn, SerIn and Start are status signals that provide decoded representations of the data stream. SerInEn indicates that the decoded message is available, SerIn defines the value (high for one, low for zero) and Start indicates the beginning of a message. SerOutEn, SerOut and End are status signals that provide encoded representations of the data stream. SerOutEn indicates that the encoded message is ready, SerOut defines the value (higher for one, low for zero) and End indicates the end of the encoded message. Synchronizers (not shown) immediately before Forward Decoder 502 and Reverse Decoder 522 resolve metastability from the FwdIn and RevIn signals. Front block 500 is shown in its normal operation configuration in FIG. 4B. FwdIn signal is received by Forward Decoder 502 and directed both to Forward Timeout 504 and Inswitch 506. The signal from Forward Decoder 502 resets the timer in Forward Timeout 504 and hence no activating signal is sent to Heal Control 510. SerIn, SerInEn and Start signals are thus passed through Inswitch 506 on to Transmit, Receive and Shift Register block 800. The RevIn signal is received by Reverse Decoder 522. This signal is split and sent to Receive Timeout 524 and Elastic Buffer 526. The decoded RevIn signal is used to Timeout 504. Elastic Buffer 526 (a 3-stage modified FirstIn, FirstOut (FIFO) buffer) stores the stream of RevIn signals (which would be a series of start cells if there is no fault in the network) and then passes them to Reverse Encoder 528. The signal from Reverse Encoder 528 is sent to Outswitch 530 which provides the RevOut signal to the Transmit, Receive and Shift Registers block 800 and receives the SerOut and End signals from Transmit, Receive and Shift Registers block 800. Forward Encoder 508 provides the encoded FwdOut signal as output from the chip.

Transmit, Receive and Shift Register block 800 is comprised of registers for the receipt, transmission and temporary storage of data. Receive Register 802 and Receive Control 804 receive SerIn, SerInEn and Start signals. Receive Control 804 also receives global enable signals and addresses from Host block 600. SerIn, SerInEn and Start signals are also sent from Receive Register 802 to Temp Register A 806 and Temp Register B 808, which route their output to Switch 814. Transmit Control 810 receives a SerOutEn signal from Forward Encoder 508 and provides a signal to Arbiter block 1300 Arbiter and Sequencer 1302. Receive Control 804 also sends a signal to Arbiter and Sequencer 1302. Transmit Register 812 receives, through Switch 814, address signals from Host block 600, as well as data signals from Transmit FIFO 1050 of RAM block 1000. Transmit, Receive and Shift Registers block 800 receives signals from Arbiter and Sequencer 1302 of Arbiter block 1300 and from Temporary Register Control 1202 of TempReg Control block 1200.

RAM block 1000 is comprised of Receive FIFO 1010, Temp 1 Register 1020, Temp 2 Register 1030, General Register 1040 and Transmit FIFO 1050. Receive FIFO 1010 passes data to RAM data bus General Register 1040 receives data from and transmits data to data bus I; Transmit FIFO receives data from data bus 1. Temp 1 1020 and Temp 2 1030 receive data from Transmit, Receive and Shift Registers block 800 and can communicate with Transmit Register 812 if switches 1060 and 814 are properly activated. RAM block 1000 receives arbitration signals from Arbiter and Sequencer 1302 and register control signals from Temporary Register Control 1202. RAM 1000 receives and transmits data on data bus 1 from Host block 600 Host Register bus 5.

Arbiter 1300, in addition to its signals to Transmit, Receive and Shift Registers block 800 and RAM 1000, also transmits to and receives signals from Temporary Register Control 1202. Arbiter and Sequencer 1302 receives command signals from Command Register 640 of Host block 600. Host block 600 performs functions of register control, bus control, interrupt control, status control, ultimate command of the chip, generating global enables, addresses, data storage in registers and status storage in registers. Bus control 610 receives CSN, AS, DS, DIR, Mode and Test signals. Data signals are received by Host block 600 and transmitted to RAM 1000 on Host Register bus 4. Those data are received and transmitted by Host Register and Data Low 650, Host Register: Data High 652, Host Register: Slot Low 654, Host Register: Slot High 655, Host Register: Type 658, Host Register: Addr Low 660, Host Register: Addr High 662. Global enables are provided by Global Enables I 620, Global Enables II 622, Global Enables III 624, Global Enables IV 626 which are transmitted onto global enables bus 2 to Receive Control 804. Local addresses Local Address Low 630 and Local Address High 632 are provided on local address bus 3 to Receive Control 804 and Transmit Register 812 (though switch 814). Status information is provided on status mask bus 5 by Status Register I Mask 670 and Status Register II Mask 672. Status Control 614 communicates with Status Register I 680 and Status Register II 692 via status bus 6. Signals from Status Register I 680 and Status Register II 682 are passed onto Status bus 7. The signals from status mask bus 5 and status bus 7 are fed to Interrupt Control 612.

Elements 620, 622, 624, 626, 630, 632, 650, 652, 654, 656, 658, 660, 662, 670, 672 each receive and transmit data onto Host Data bus 8. Command register 640 receives data from Host Data bus 8. Status Register I 680 and Status Register II 682 transmit data onto Host Data bus 8. Signals AD0 through AD7 are taken from Host Data bus 8. Signals taken from Host Data bus 8 also are used to control Addr Latch 1 606, Addr Latch 2 604, Register Control 602 and Data Latch 608.

Figure 4C:
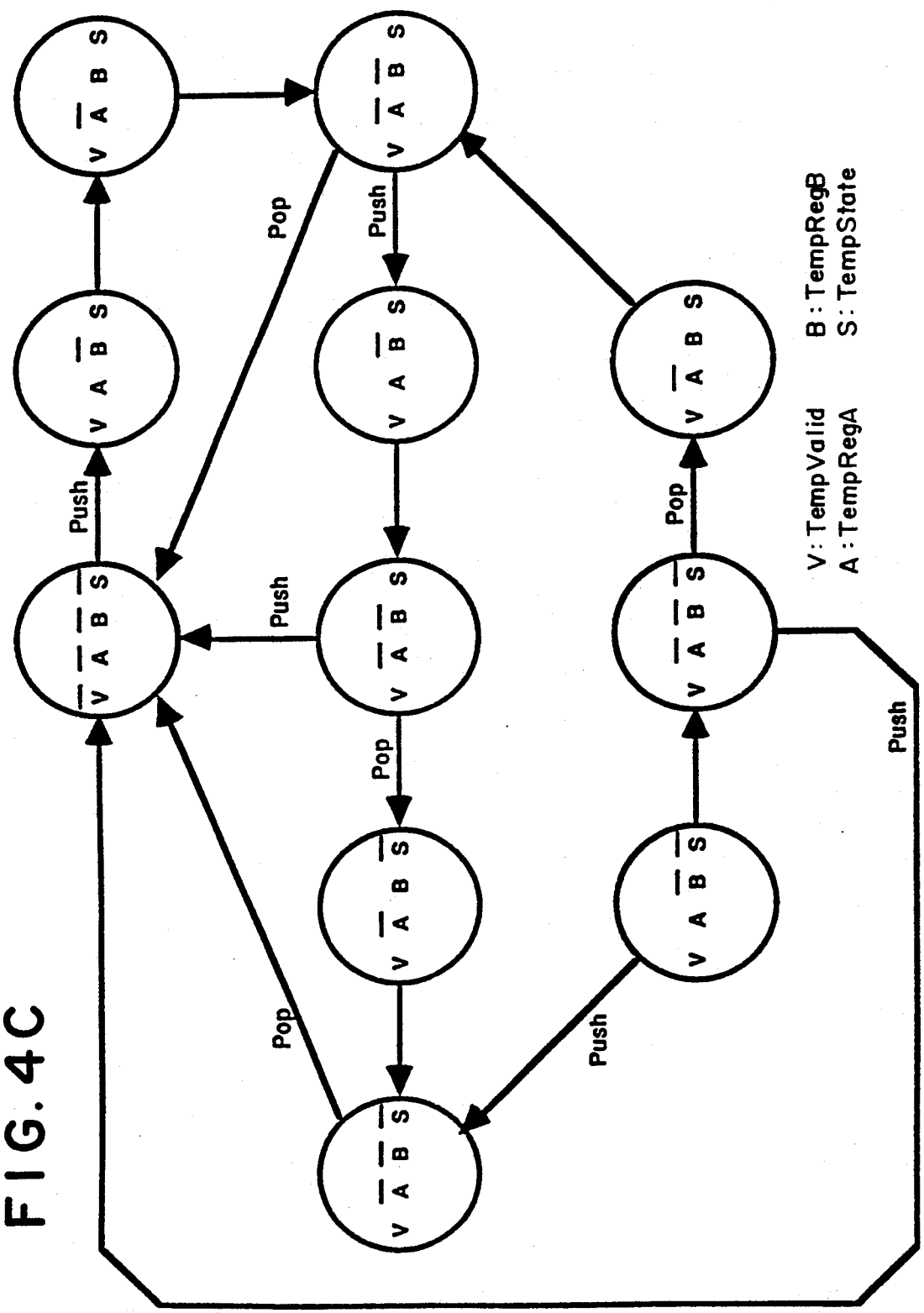
FIG. 4C is a state diagram of the temporary register control.

Front block 500 performs the functions of timing to determine if a network fault has occurred, rerouting of the data flow to the backup ring, looping back if a node has failed or faults have occurred in both rings, cell synchronization within the node to allow for asynchronous operation between nodes and elastic buffering of the data from the backup node. Message level elastic buffering is performed by use of conventional logic elements within the Transmit, Receive and Shift Registers block 800 RAM block 100 and TempReg Control block 1200. The forward elastic buffer is a two-stage FIFO for 60 bit messages (excluding 12 CRC bits). Received messages which must be forwarded are pushed into the forward elastic buffer from receive register 802; messages are popped from buffer into the transmit register. The buffer is implemented by the Temp 1 and Temp 2 registers of RAM 1000 and Temp A and Temp B registers of Transmit, Receive and Shift Registers block 800. Two RAM locations are used to store 48 bits of the message, two 12-bit registers are used to store the remaining bits. Control of these elements is accomplished via the Temporary Register Control block 1200 state machine of FIG. 4C. Implementation of elastic buffering in this manner saves space on the integrated circuit chip.

FIG. 5 shows a state diagram which illustrates both Forward Encoder 508 and Reverse Encoder 528. The encoder is implemented as a finite state machine of 18 states. It generates a bit pattern at the output Out of '111000' followed by (i) '111', (ii) '000' or (iii) '000000' depending on whether (i) the input End is low and SerOut is high, (ii) End is low and SerOut is low or (iii) End is high. The output SerOutEn is used to provide a handshake signal to the transmitter (which drives the encoder).

Figure 6:
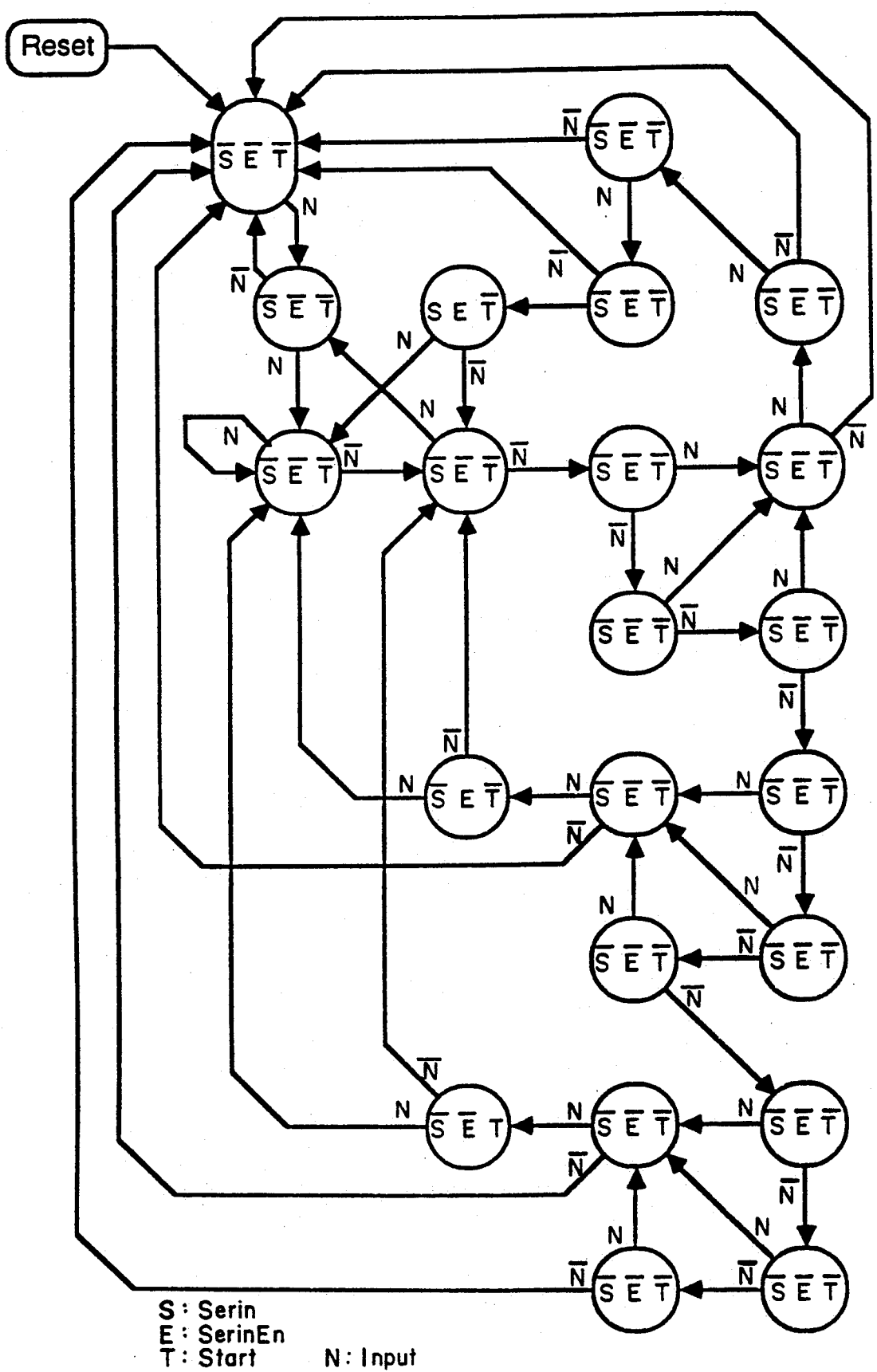
FIG. 6 is a state diagram of the ASIC decoder section.

FIG. 6 shows a state diagram which illustrates both Forward Decoder 502 and Reverse Decoder 522. The decoder is implemented as a finite state machine of 22 states. It watches its input, FwdIn or RevIn, for various bit patterns. If a valid bit pattern is detected, it asserts one or more of its outputs, SerIn, SerInEn and Start. If an invalid pattern is detected, the machine asserts no outputs and goes back to looking for valid patterns. The valid bit patterns are decoded in the following Table 1:

TABLE 1

| Bit Pattern | SerIn | SerInEn | Start |
|---|---|---|---|
| 0011111 | 1 | 1 | 0 |
| 00011111 | 1 | 1 | 0 |
| 000011111 | 1 | 1 | 0 |
| 0000011 | 0 | 1 | 0 |
| 00000011 | 0 | 1 | 0 |
| 000000011 | 0 | 1 | 0 |
| 0000000011 | 0 | 0 | 1 |
| 00000000011 | 0 | 0 | 1 |
| 000000000011 | 0 | 0 | 1 |

It will be seen by one skilled in the art that this decoding pattern implements the meaning of the data cells which allow for asynchronous operation.

Figure 7:
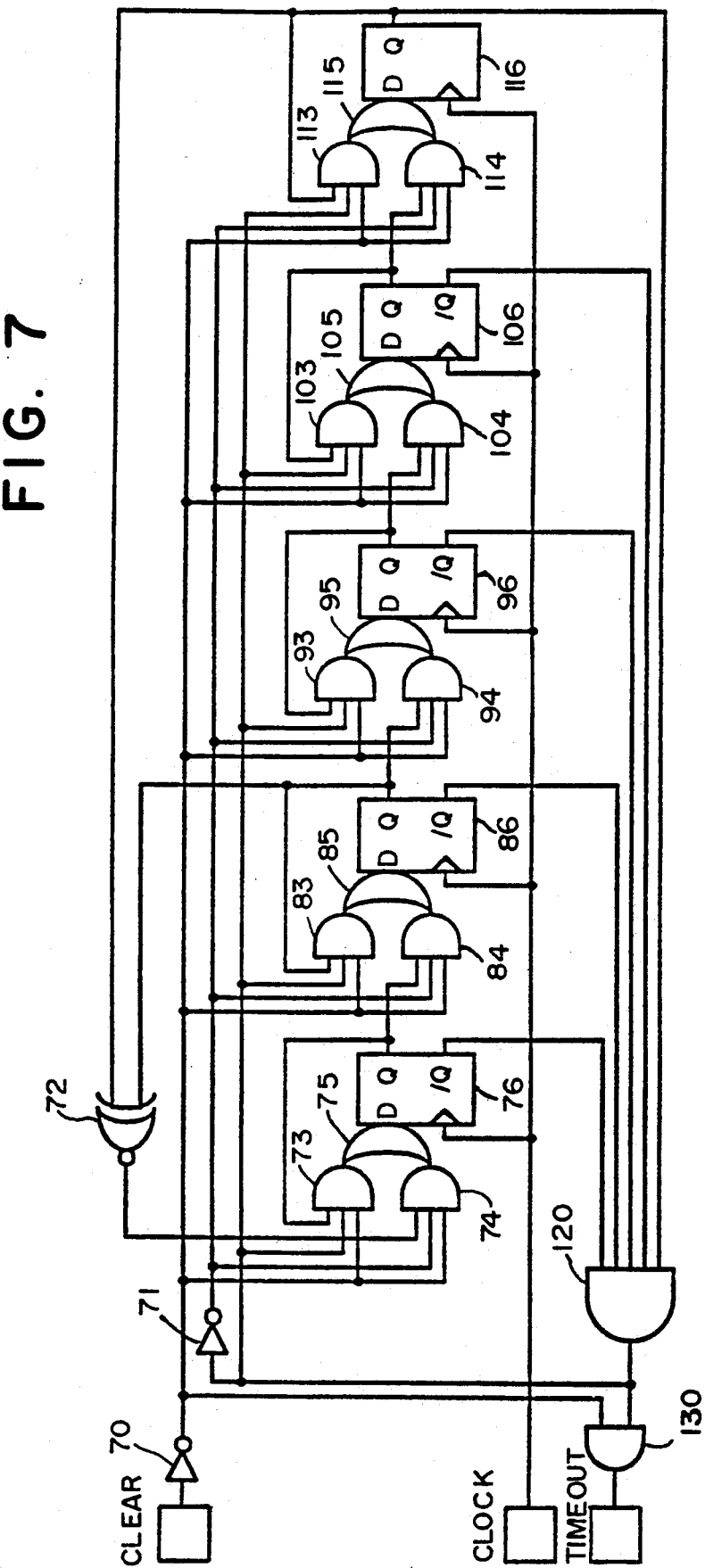
FIG. 7 is a logic block diagram of the ASIC timer.

FIG. 7 shows a schematic representation of both Forward Timeout 504 and Reverse Timeout 524 of the timeout timer. The timeout timer is implemented as a Linear-Feedback Shift Register of 5 stages. It has an input Clear and an output Timeout, with each stage driven by the clock driving the ASIC. As illustrated by the first stage, each stage is implemented by two AND gates IO (73 and 74) feeding an or gate (75), which in turn feeds a D Flip-flop (76). Signals from the second and fifth stages are fed back to the first stage through XNOR gate 72. Clear signals are fed to each stage through NOT gate 70. Signals from each stage are combined in AND gate 120 and fed back to each stage in uninverted form and also in inverted form through NOT gate 71. The combined signal from AND gate 120 and the clear signal from NOT gate 70 and fed through AND gate 130 to determine whether timeout has occurred. Clock signals from the clock driving the ASIC and input to each stage. The timeout timer starts with the pattern '00000' and counts clocks until (i) the pattern '00001' is reached when it stops (until cleared) or (ii) it is cleared back to '00000'.

The counting pattern sequence is shown in Table 2:

TABLE 2

| Count | Bit Pattern |
|---|---|
| 0 | 00000 |
| 1 | 10000 |
| 2 | 11000 |
| 3 | 01100 |
| 4 | 00110 |
| 5 | 10011 |
| 6 | 01001 |
| 7 | 10100 |
| 8 | 11010 |
| 9 | 01101 |
| 10 | 10110 |
| 11 | 11011 |
| 12 | 11101 |
| 13 | 11110 |
| 14 | 01111 |
| 15 | 10111 |
| 16 | 01011 |
| 17 | 10101 |
| 18 | 01010 |
| 19 | 00101 |
| 20 | 00010 |
| 21 | 10001 |
| 22 | 01000 |
| 23 | 00100 |
| 24 | 10010 |
| 25 | 11001 |
| 26 | 11100 |
| 27 | 01110 |
| 28 | 00111 |
| 29 | 00011 |
| 30 | 00001 |

Hence, If the timer is not cleared, it will timeout after 30 clocks. It should be noted that this timeout function could also be implemented by a counter or by an analog function.

Figure 8:
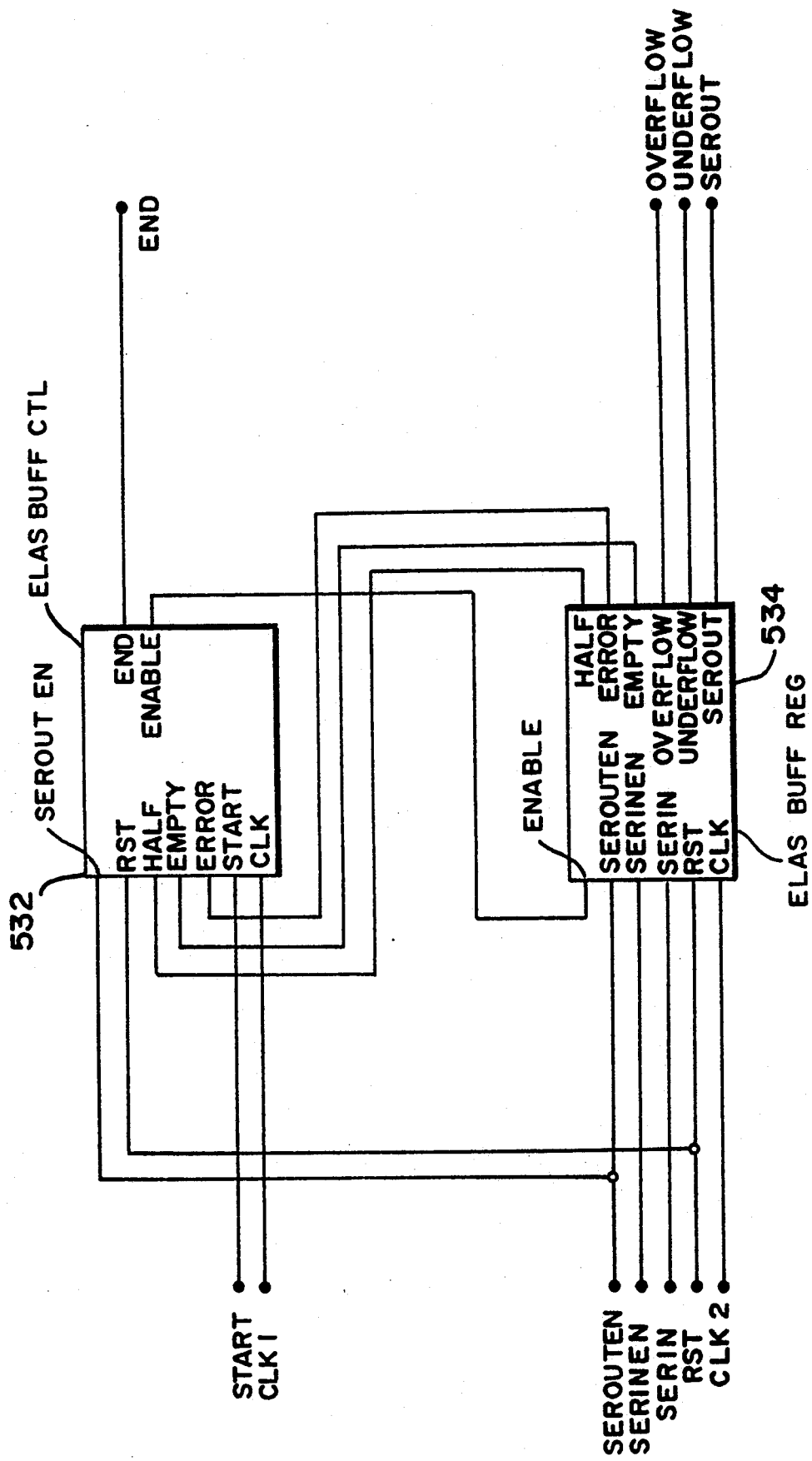
FIG. 8 is a block diagram for the reverse elastic buffer.
Figure 9:
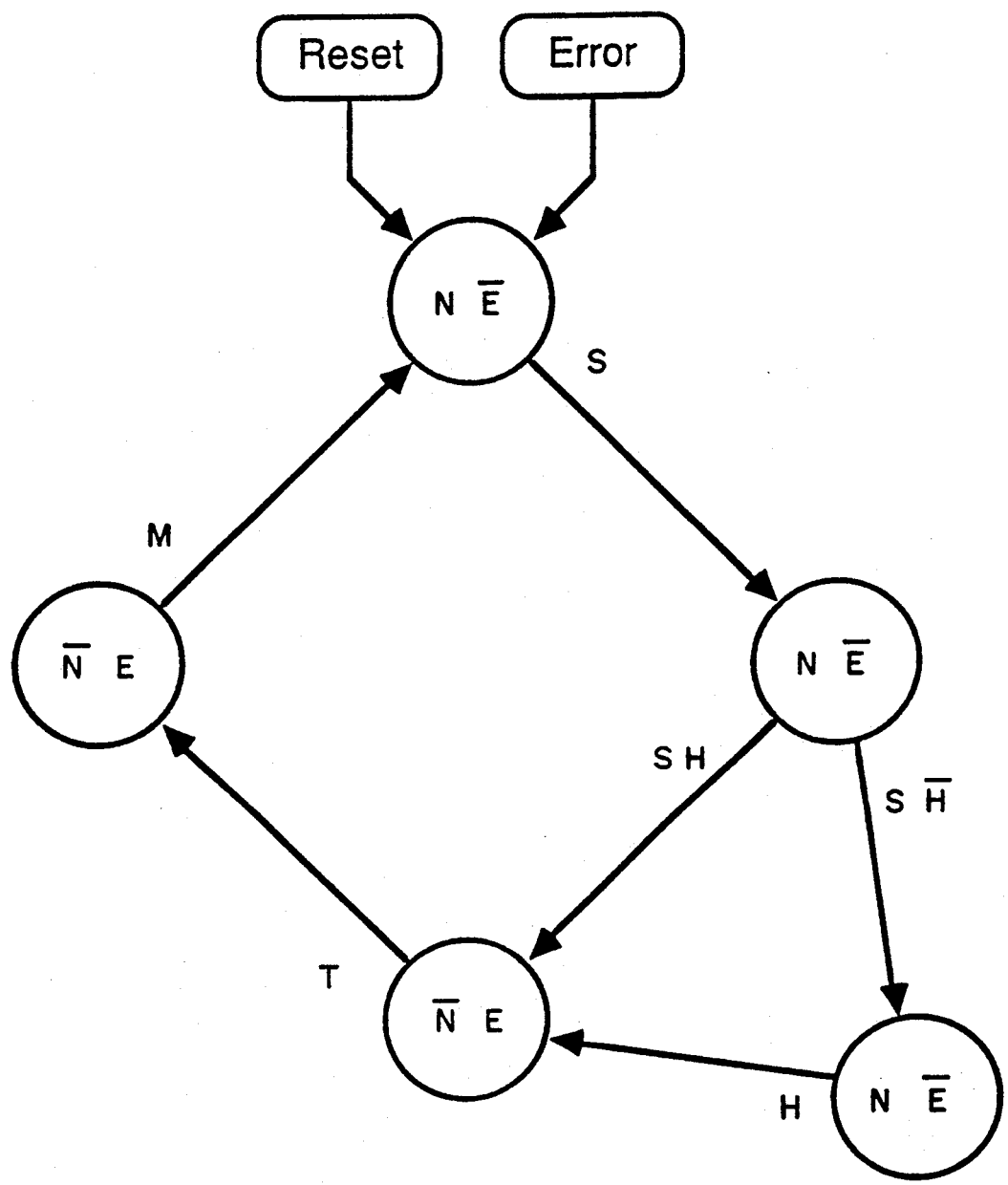
FIG. 9 is a state diagram of the ASIC reverse elastic buffer control.

Elastic buffer 526 is shown in FIG. 8, with the passage of singals between elastic buffer control 532 (PELASBUFFCTL) and the elastic buffer register 532 (ELASBUFFREG). The state diagram of the elastic buffer control is shown in FIG. 9.

The reverse elastic buffer 526 is based on the principle that start cells may be added or deleted between messages but not withn a message. The state machine of FIG. 9 controls the addition or deletion of start cells between messages and controls the cell FIFO which buffers data zero cells and data one cells. The state machine ensures that when a message begins, cells are not retransmitted until the FIFO contains two data cells. Since the FIFO contains three stages, a data cell may be absorbed or supplied by the buffer in the course of a message.

Figure 10:
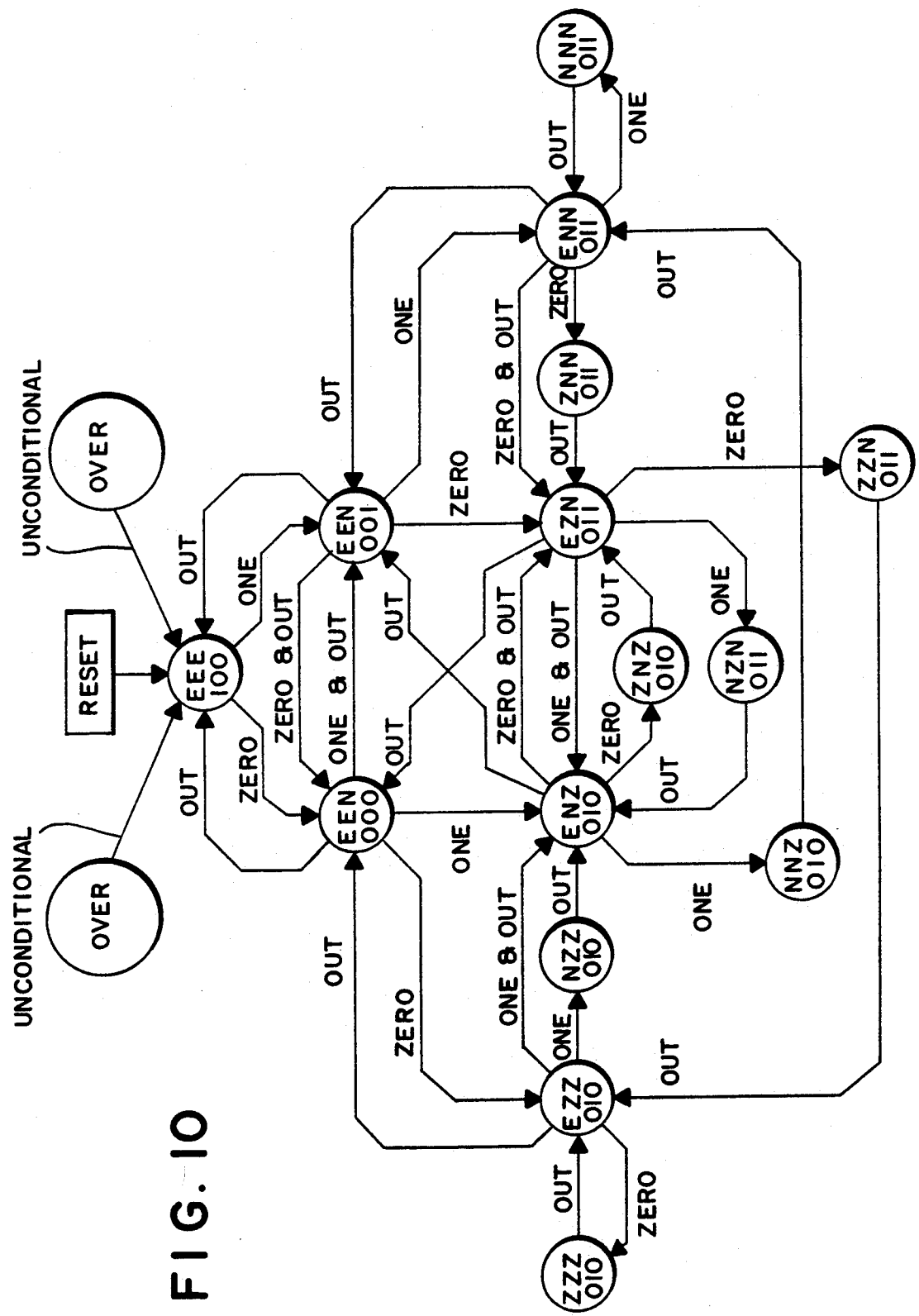
FIG. 10 is a state diagram of the ASIC reverse elastic buffer register.

The state diagram of the Elastic buffer register i shown in FIG. 10, with the corresponding Boolean algebra equations shown in Table 3.

TABLE 3

```
INPUTS rst SerIn SerInEn SerOutEn Enable ;
OUTPUTS SerOut UnderFlow Empty Error Half;
LET DataZero =  !SerIn & SerInEn &   !(SerOutEn & Enable) ;
LET DataOne  =   SerIn & SerInEn &   !(SerOutEn & Enable) ;
LET OutZero  =  !SerIn & SerInEn &    SerOutEn & Enable ;
LET OutOne   =   SerIn & SerInEn &    SerOutEn & Enable ;
LET ShiftOut =          !SerInEn &    SerOutEn & Enable ;
STATE EEE   Rst       →  EEE Empty=1 ,
            DataZero  →  EEZ Empty=1 ,
            DataOne   →  EEN Empty=1 ,
            OutZero   →  Under Empty=1 ,
            OutOne    →  Under Empty=1 ,
            ShiftOut  →  Under Empty=1 ,
                      →  EEE Empty=1 ;
STATE EEZ   Rst       →  EEE ,
            DataZero  →  EZZ ,
            DataOne   →  ENZ ,
            OutZero   →  EEZ ,
            OutOne    →  EEN ,
            ShiftOut  →  EEE ,
                      →  EEZ ;
STATE EEN   Rst       →  EEE SerOut=1 ,
            DataZero  →  EZN SerOut=1 ,
            DataOne   →  ENN SerOut=1 ,
            OutZero   →  EEZ SerOut=1 ,
            OutOne    →  EEN SerOut=1 ,
            ShiftOut  →  EEE SerOut=1 ,
                      →  EEN SerOut=1 ;
STATE EZZ   Rst       →  EEE Half=1 ,
            DataZero  →  ZZZ Half=1 ,
            DataOne   →  NZZ Half=1 ,
            OutZero   →  EZZ Half=1 ,
            OutOne    →  ENZ Half=1 ,
            ShiftOut  →  EEZ Half=1 ,
                      →  EZZ Half=1 ;
STATE ENZ   Rst       →  EEE Half=1 ,
            DataZero  →  ZNZ Half=1 ,
            DataOne   →  NNZ Half=1 ,
            OutZero   →  EZN Half=1 ,
            OutOne    →  ENN Half=1 ,
            ShiftOut  →  EEN Half=1 ,
                      →  ENZ Half=1 ;
STATE EZN   Rst       →  EEE Half=1 SerOut=1 ,
            DataZero  →  ZZN Half=1 SerOut=1 ,
            DataOne   →  NZN Half=1 SerOut=1 ,
            OutZero   →  EZZ Half=1 SerOut=1 ,
            OutOne    →  ENZ Half=1 SerOut=1 ,
            ShiftOut  →  EEZ Half=1 SerOut=1 ,
                      →  EZN Half=1 SerOut=1 ;
STATE ENN   Rst       →  EEE Half=1 SerOut=1 ,
            DataZero  →  ZNN Half=1 SerOut=1 ,
            DataOne   →  NNN Half=1 SerOut=1 ,
            OutZero   →  EZN Half=1 SerOut=1 ,
            OutOne    →  ENN Half=1 SerOut=1 ,
            ShiftOut  →  EEN Half=1 SerOut=1 ,
                      →  ENN Half=1 SerOut=1 ;
STATE ZZZ   Rst       →  EEE Half=1 ,
            DataZero  →  Over Half=1 ,
            DataOne   →  Over Half=1 ,
            OutZero   →  Over Half=1 ,
            OutOne    →  Over Half=1 ,
            ShiftOut  →  EZZ Half=1 ,
                      →  ZZZ Half=1 ;
STATE NZZ   Rst       →  EEE Half=1 ,
            DataZero  →  Over Half=1 ,
            DataOne   →  Over Half=1 ,
            OutZero   →  Over Half=1 ,
            OutOne    →  Over Half=1 ,
            ShiftOut  →  ENZ Half=1 ,
                      →  NZZ Half=1 ;
STATE ZNZ   Rst       →  EEE Half=1 ,
            DataZero  →  Over Half=1 ,
            DataOne   →  Over Half=1 ,
            OutZero   →  Over Half=1 ,
            OutOne    →  Over Half=1 ,
```

TABLE 3-continued

```
            ShiftOut  →  EZN Half=1 ,
                      →  ZNZ Half=1 ;
STATE NNZ   Rst       →  EEE Half=1 ,
            DataZero  →  Over Half=1 ,
            DataOne   →  Over Half=1 ,
            OutZero   →  Over Half=1 ,
            OutOne    →  Over Half=1 ,
            ShiftOut  →  ENN Half=1 ,
                      →  NNZ Half=1 ;
STATE ZZN   Rst       →  EEE Half=1 SerOut=1 ,
            DataZero  →  Over Half=1 SerOut=1 ,
            DataOne   →  Over Half=1 SerOut=1 ,
            OutZero   →  Over Half=1 SerOut=1 ,
            OutOne    →  Over Half=1 SerOut=1 ,
            ShiftOut  →  EZZ Half=1 SerOut=1 ,
                      →  ZZN Half=1 SerOut=1 ;
STATE NZN   Rst       →  EEE Half=1 SerOut=1 ,
            DataZero  →  Over Half=1 SerOut=1 ,
            DataOne   →  Over Half=1 SerOut=1 ,
            OutZero   →  Over Half=1 SerOut=1 ,
            OutOne    →  Over Half=1 SerOut=1 ,
            ShiftOut  →  ENZ Half=1 SerOut=1 ,
                      →  NZN Half=1 SerOut=1 ;
STATE ZNN   Rst       →  EEE Half=1 SerOut=1 ,
            DataZero  →  Over Half=1 SerOut=1 ,
            DataOne   →  Over Half=1 SerOut=1 ,
            OutZero   →  Over Half=1 SerOut=1 ,
            OutOne    →  Over Half=1 SerOut=1 ,
            ShiftOut  →  EZN Half=1 SerOut=1 ,
                      →  ZNN Half=1 SerOut=1 ;
STATE NNN   Rst       →  EEE Half=1 SerOut=1 ,
            DataZero  →  Over Half=1 SerOut=1 ,
            DataOne   →  Over Half=1 SerOut=1 ,
            OutZero   →  Over Half=1 SerOut=1 ,
            OutOne    →  Over Half=1 SerOut=1 ,
            ShiftOut  →  ENN Half=1 SerOut=1 ,
                      →  NNN Half=1 SerOut=1 ;
STATE Over            →  EEE Overflow=1 Error=1 ;
STATE Under           →  EEE Underflow=1 Error=1;
END
```

Figure 11:
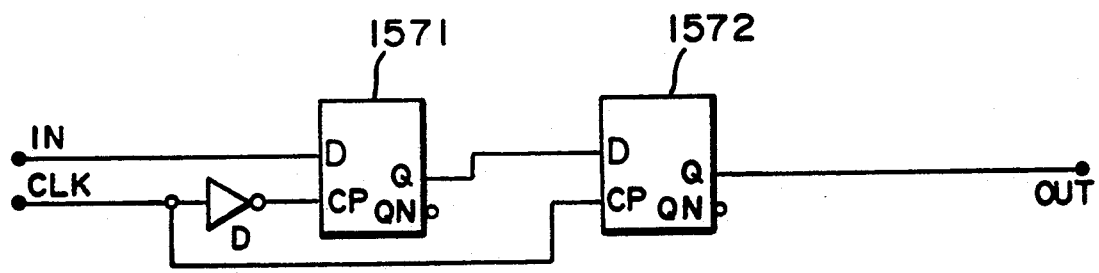
FIG. 11 is a logic block diagram for the synchronizer.

Synchronizers 570 and 580 are shown as two DFlip-Flops 1571 and 1572 in FIG. 11. The synchronizers greatly reduce the probability of logic errors from being generated within a node, caused by set up and hold time violations of synchronization logic.

Data Receipt and Transmission

The receive section of the RTN controller is comprised of a shift register (Receive Register 802) driven by the cell decoder (either Forward Decoder 502 or Reverse Decoder 522, depending upon the self-healing state, as described below). The receive section performs the following functions:

(1) It accepts decoded cells from the cell decoder and attempts to assemble messages. If a message fragment (i.e. less than 72 bits) is received, the fragment received status is asserted and the fragment is discarded.

(2) It checks the CRC of the received message. If it is invalid, the CRC error status is asserted and the message is discarded.

(3) It checks the source address of the received message. If it matches the local address, the address match status is asserted and the message is stripped of its source and CRC fields and placed in one of the General Registers 1040.

(4) It checks the destination address of the received message. If it matches the local address, the message is stripped of its destination and CRC fields and placed in the Receive FIFO 1010.

(5) It checks the type field of the received message. If it corresponds to an alpha-message, the message is stripped of its destination and CRC fields and placed in the Receive FIFO 1010.

(6) If the type field corresponds to a gamma message or a delta message, the message is stripped of its destination and CRC fields and placed in the Receive FIFO 1010. Also, the message is placed in the next available temporary register (Temp 1 1020 or Temp 2 1030, and Temp A 806 or Temp B 808) for retransmission.

(7) If all of the above matches have failed, the message is placed in the next available temporary register for retransmission.

(8) If a message overrun (i.e. more than 72 bits) is received, the overrun status is asserted and the fragment (bits beyond 72) is discarded.

The transmit section of the RTN controller is comprised of a shift register (Transmit Register 81(2) feeding the cell encoder (either Forward Encoder 508 or Reverse Encoder 528, depending upon the self-healing state, as described below). It also ensures that at least two start cells are transmitted between messages. This allows elastic buffers to work, because one start cell will be lost if a faster node is transmitting to a slower node, if the accumulated clock differences exceed the time interval length of one start cell. If a slower node is transmitting to a faster node, another start cell will be inserted by the faster node when it retransmits the message if the accumulated clock differences exceed the time interval of the start cell. The transmit section performs the following functions:

(1) It checks the temporary registers (Temp 1 1020, Temp 2 1030, Temp A 806, and Temp B 808) (which may contain a message ready for forwarding). If the temporary registers are not empty, it accepts that message.

(2) If the temporary registers are empty, it checks the Transmit FIFO 1050. If the Transmit FIFO 1050 is not empty, it accepts a message and appends a source address field to the message (from the Local Address Registers 630 and 63(2).

(3) It generates the CRC field and appends it to the message.

(4) It sends the resulting 72-bit message to the cell encoder (Forward Encoder 508 or Reverse Encoder 528, depending on self-healing state), one bit at a time.

(5) If the temporary registers and the Transmit FIFO 1050 are empty, start cells are transmitted.

RTN Fault - tolerance

In the preferred embodiment, the RTN employs two fiber optic rings, a primary ring and a backup ring. Data transmission occurs on the primary ring in one direction. The backup ring is idle, with only start cells (or, alternatively other kinds of data cells) being transmitted, unless used to overcome a network fault. Data transmission in the backup ring is in the direction opposite to that in the primary ring. The ASIC contains circuitry which supports the backup ring and which allows data transmission from one ring to be routed through a node and loop back onto the other ring. The self-healing function is handled at the RCP level and employs the RCP forward encoder, reverse encoder, forward cell decoder, reverse cell decoder and transmitter. FIGS. 12A, 12B, 12C, and 12D illustrate ring and node failures.

Figure 12A:
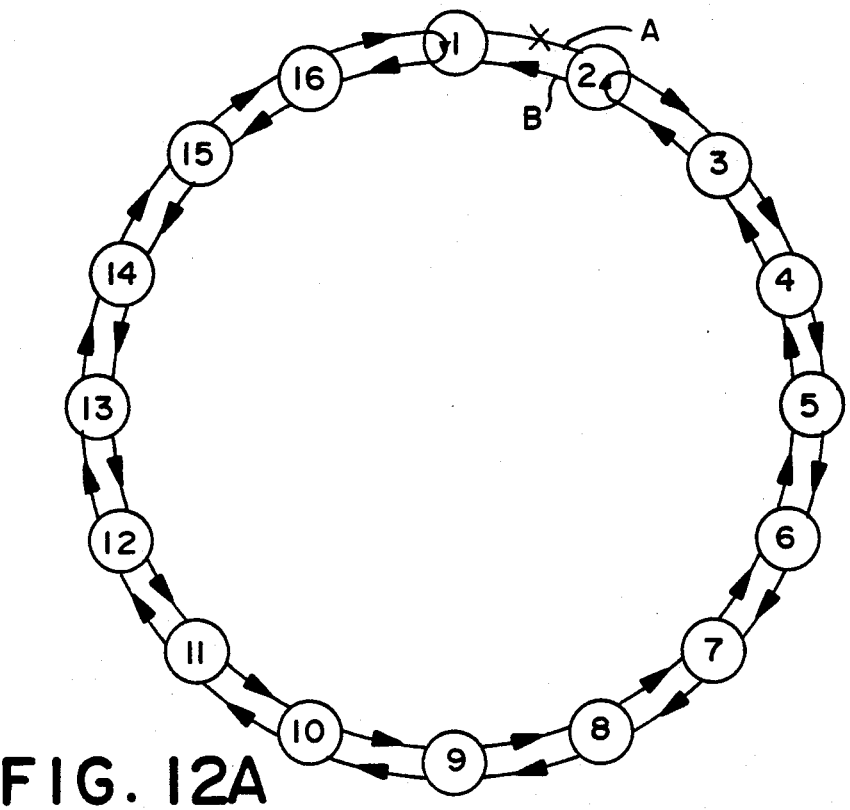
FIGS. 12A-12D shows various ring failure possibilities and network self-healing.
Figure 12B:
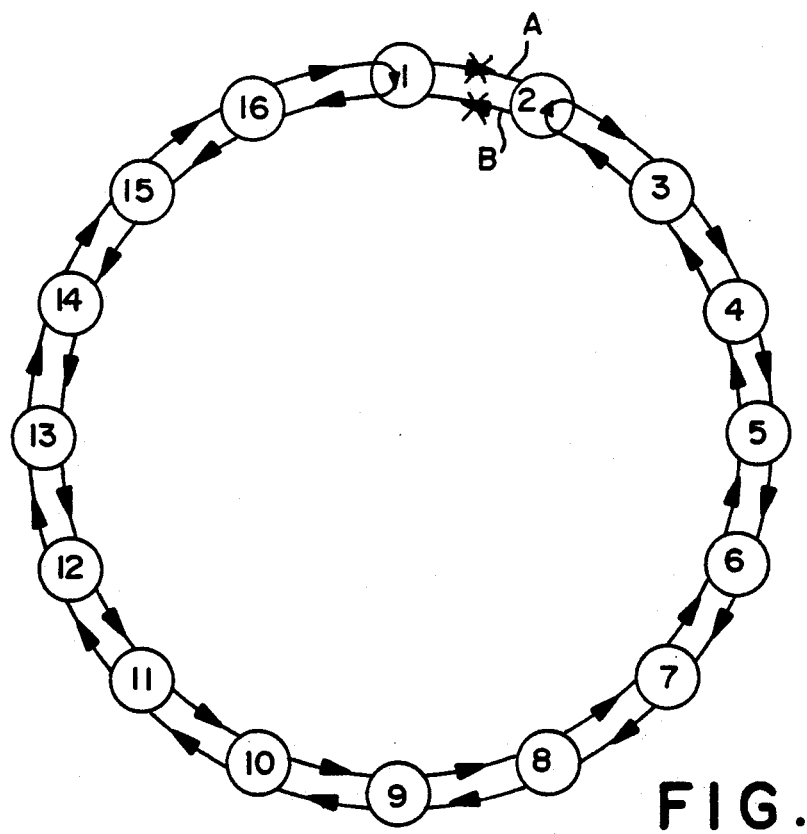
Figure 12C:
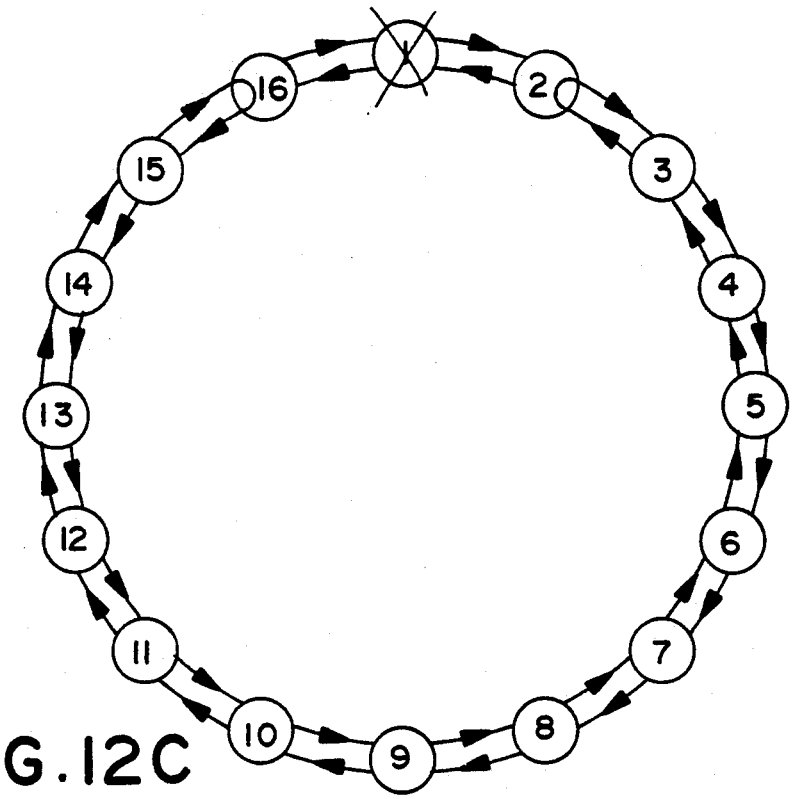
Figure 12D:
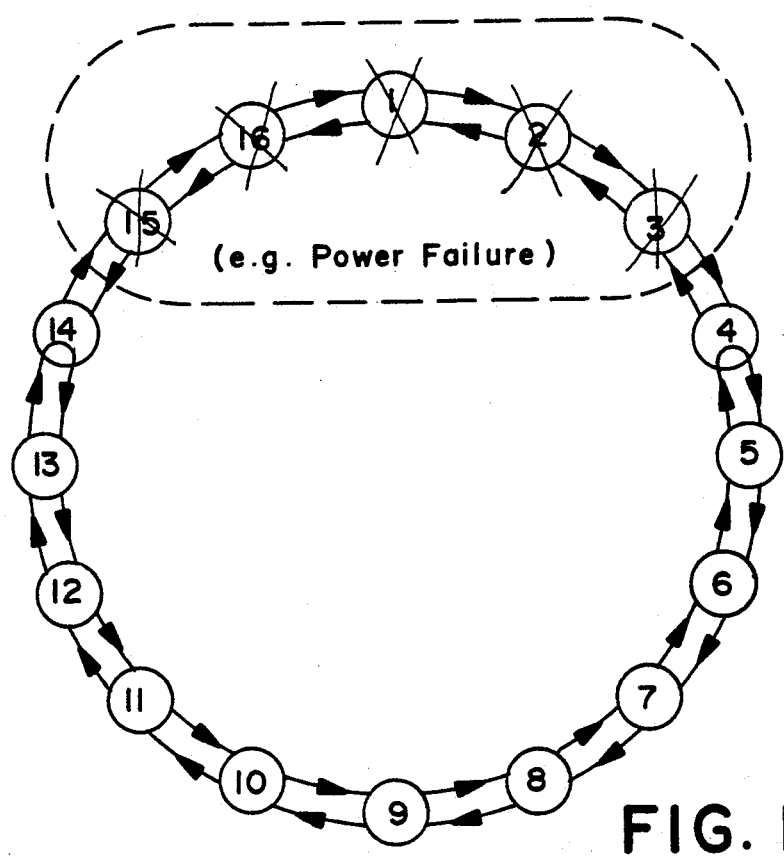

FIGS. 12A–12D illustrate a dual loop ring network having 16 nodes. FIG. 12A illustrates a network failure on the primary connector line A between nodes 1 and 2. Ring self-healing is illustrated by loopback being performed in nodes 1 and 2, so that a continuous data path is kept intact, with all 16 nodes in communication. FIG. 12B illustrates a network failure wherein both the primary connector line A and the secondary (backup) connector line B have failed between nodes 1 and 2. Ring self-healing is illustrated by loopback in nodes 1 and 2. FIG. 12C illustrates a node failure at node Ring self-healing is performed by loopback in nodes 16 and 2. FIG. 12D illustrates a block of node failures for nodes 1, 2, 3, 15 and 16, caused, for example, by a power failure. Ring self-healing is performed by loopback through nodes 4 and 14 thus isolating the failed nodes.

FIG. 13A–13D illustrate the decoding and encoding of signals during normal operation, as well as the self-healing operation during forward fail, reverse fail and combined forward and reverse fail modes. During normal operation (FIG. 13A), because data signals are being received by both Forward Decoder 502 and Reverse Decoder 522, neither Forward Timeout 504 nor Reverse Timeout 524 times outs. Therefore, no signal is sent to Heal Control 510. Inswitch 506 and Outswitch 530 are thus left set in their normal positions. The result is that data signals flow from Forward Decoder 502 through Inswitch 506, with SerIn, SerInEn and start signals being sent on to Transmit, Receive and Shift Register block 800. The series of start cells which are circulated on the reverse ring during normal operation are routed through Reverse Decoder 502 to Elastic Buffer 526 to Reverse Encoder 528, through Outswitch 530 and back onto the reverse ring. During normal operation, Forward Encoder receives SerOut and End signals from the Transmit Register 812 of Transmit, Receive and Shift Registers block 800 and these encoded signals are placed on the forward ring.

During forward fail operation (FIG. 13B), no signal is received from the forward ring by Forward Decoder 502. Forward Timeout 504 times out, resulting in Heal Control 50 activating Inswitch 506 and Outswitch 530. Inswitch 506 is set so that the signals coming from Reverse Decoder 522 are routed through Inswitch 506 to Receive Register 802 and Receive Control 804 of Transmit, Receive and Shift Register Block 800. Outswitch 530 is set to ground. Thus Elastic Buffer 526 and Reverse Encoder 528 are deactivated. Output signal are passed through Forward Encoder 508 and placed on the forward ring.

Figure 13A:
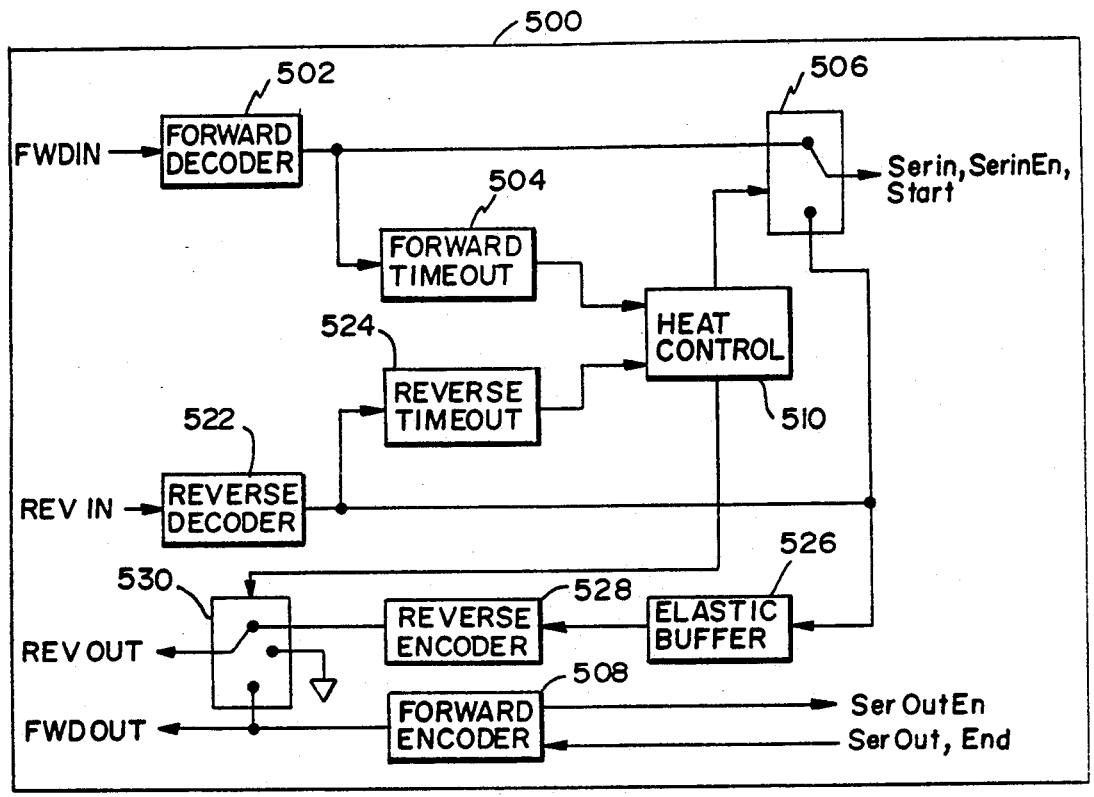
FIGS. 13A-13D illustrates switching within the RTN during normal operation and to effect network self-healing.
Figure 13B:
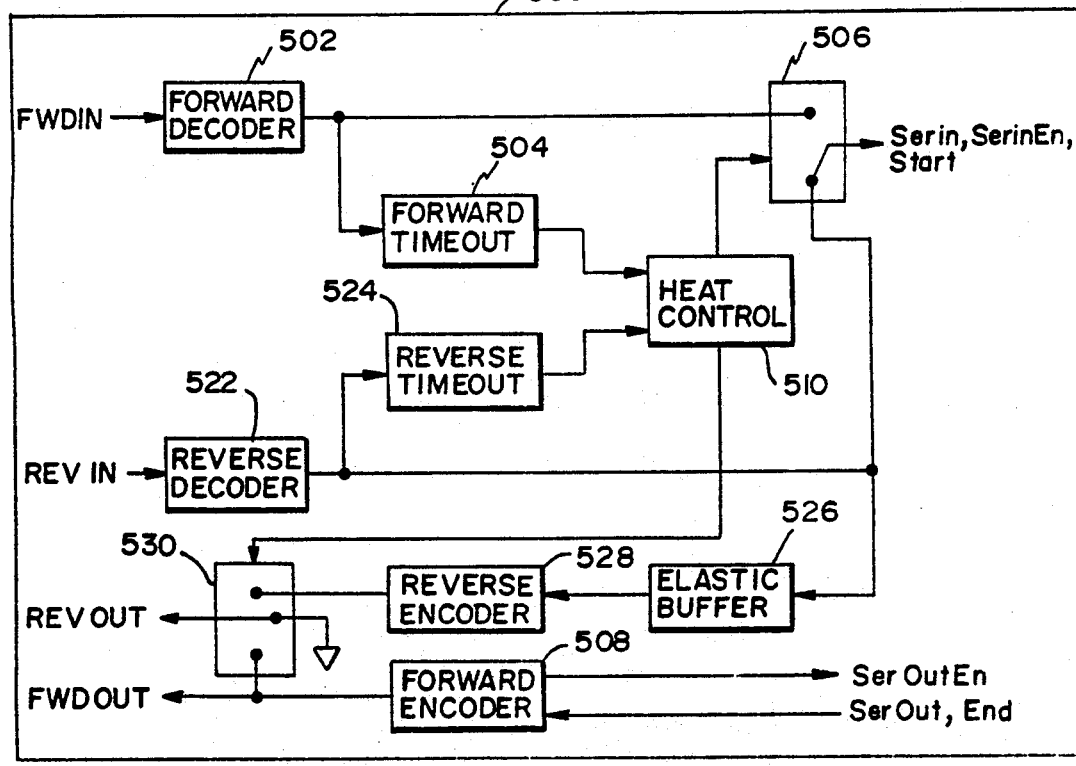
Figure 13C:
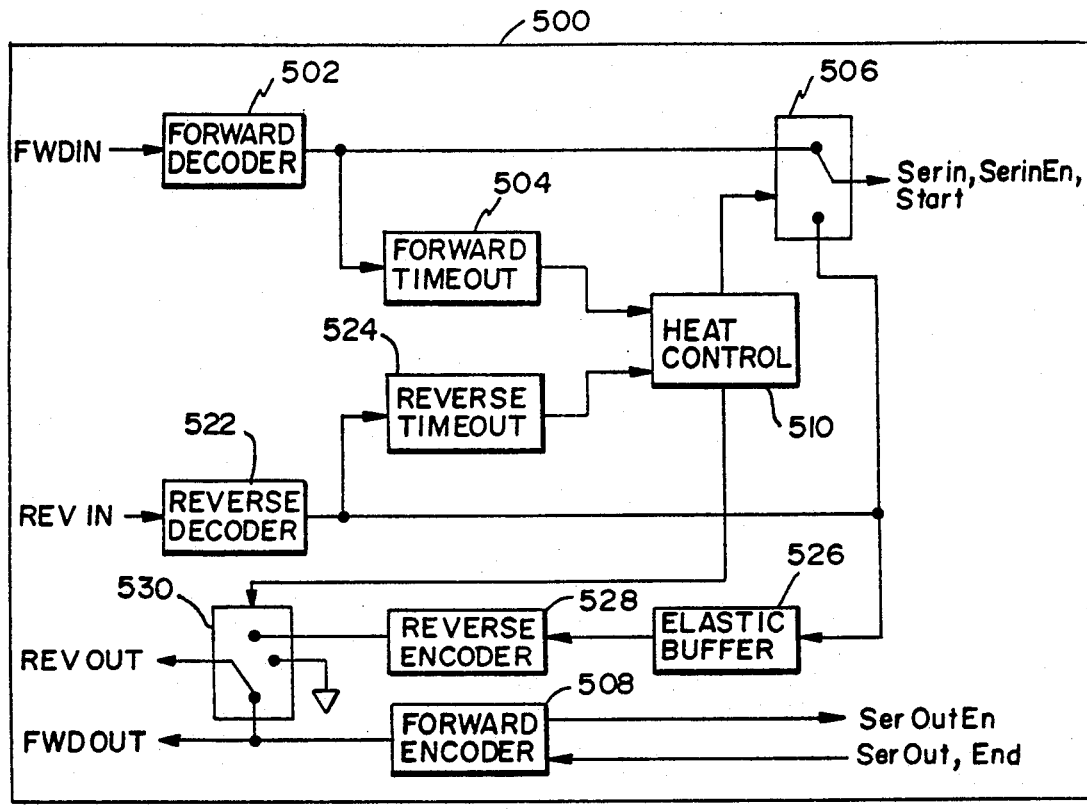

FIG. 13C illustrates reverse fail operation. In this case, the forward signal handling is as in normal operation, with the Inswitch 506 in its normal setting. However, a failure on the reverse ring results in no data signal being received by Reverse Decoder 522 and Reverse Timeout 524 times out. Heal Control 510 is activated and Outswitch 530 is activated and Reverse Encoder 528 and Elastic Buffer 526 bypassed. The SerOut and End signals which are encoded by Forward Encoder 508 are sent out onto both the forward and reverse rings.

Figure 13D:
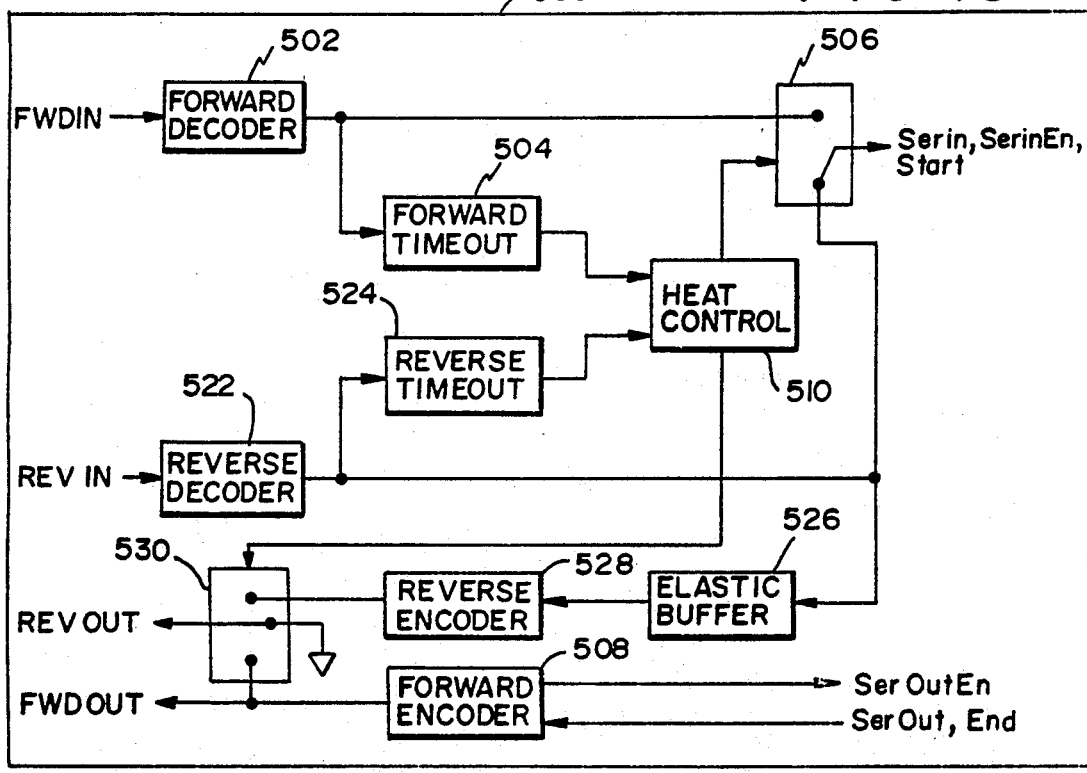

FIG. 13D illustrates combined forward and reverse failure modes, in which a node is isolated. Both Forward Timeout 504 and Reverse Timeout 524 time out and hence activate Inswitch 506 and Outswitch 530, setting them as in forward fail operation. When a node is isolated, configuring the Inswitch 506 and Outswitch 530 in these positions enables the remaining connected nodes to initiate self-healing.

In addition to the preferred embodiment of the ASIC, there are numerous modifications which are contemplated. Rather than implementing the ASIC using CMOS technology, TTL, ECL, NMOS or GaAs technologies could also be used. Designs operating at approximately 100 MHz are contemplated.

The architecture and logic of the ASIC can be modified. For example, instead of using state machines for decoding and encoding, these functions can be implemented by shift registers preceded or followed by logic combinations. Timers in combination with logic elements could also be used.

The ASIC data comparison is shown performed in parallel. It could also be performed in serial fashion.

With respect to the registers in the ASIC, the general registers and first-in-first-out registers could be implemented in the host processor rather than in the ASIC itself. Alternatively, the use of RAM-based first-in-first out registers could be replaced by dedicated first-in-first-out registers or by using direct memory access (DMA) in the host processor.

Finally, the elastic buffering could be used in the forward channel between the decoder and the InSwitch just before the receiver register. The elastic buffering in the reverse channel could be implemented by shift registers and logics.

The above discussion, figures and tables of the present invention are directed primarily to the preferred embodiment of the invention. Numerous changes and modifications in the actual implementation of the invention described herein will be readily apparent to those of ordinary skill in the art, and it is contemplated that such changes and modifications may be made without departing from the scope of the invention as defined by the following claims.

What is claimed is:

1. A data network comprising:
   a. a plurality of nodes asynchronously sending and receiving data signals,
   b. a first data pathway for connecting said nodes,
   c. a second data path for connecting said nodes,
   d. means located at each node for detecting a fault in either of said first or said second data pathways, such means operating independently of all other said nodes, and
   e. means located at each node for switching between said first and said second data pathways upon the detection of a fault, such means operating independently of all other said nodes.

2. A data network according to claim 1, further comprising, at each siad node, means for elastically buffering received data signals and means for clocking data signals independently of each of the other said nodes.

3. A data network according to claim 1, wherein each node further comprises:
   a. means for receiving data signals independent of phase of said data signals, and
   b. recognizing data signals independent of clocking at any other node.

4. A data network according to claim 1, wherein said first and said second data pathways are comprised of fiber optic cables.

5. A data network according to claim 1, wherein said first and said second data pathways are comprised of wire connectors.

6. A data network according to claim wherein each node further comprises:
   a. means for clocking independent of all other nodes,
   b. means for sending data signals on said first data pathway,
   c. means for sending data signals on said second data pathway,
   d. means for receiving data signals on said first data pathway,
   e. means for receiving data signals on said second data pathway,
   f. means for detecting the absence of data signals on said first data pathway which operate independently of all other nodes,
   g. means for detecting the absence of data signals on said second data pathway which operate independently of all other nodes,
   h. means for switching between said first and said second data pathways upon the detection of the absence of data signals,
   i. means for elastically buffering received data signals from said first data pathway, and
   j. means for elastically buffering received data signals from said second data pathway.

7. A data network according to claim 6, wherein each means (a) through (j) is implemented in an integrated circuit at each node.

8. A data network node comprising:
   a. means for receiving data signals from a first data pathway, independent of timing functions external thereto,
   b. means for receiving data signals from a second data pathway, independent of timing functions external thereto,
   c. means for sending data signals on said first data pathway,
   d. means for sending data signals on said second data pathway,
   e. means for storing said received data signals from said first data pathway independent of the phase of data signals sent on said first data pathway,
   f. means for storing said received data signal from said second data pathway independent of the phase of data signals sent on said second data pathway,
   g. means for selecting between data signals from said first data pathway and said second data pathway,
   h. means for communicating said selected signals to a host microprocessor,
   i. means for receiving commands from said host micro-processor,
   j. means for detecting the absence of data signals from said first data pathway,
   k. means for detecting the absence of data signals from said second data pathway,
   l. means for switching between said first data pathway and said second data pathway in the event of the detection of the absence of data in one of said data pathways.

9. A data network node according to claim 8 wherein said means (a) through (l) are implemented in an integrated circuit.

10. An apparatus for transmitting data asynchronously between data network nodes, comprising:
   a. clock means for generating a clock interval signal, located at each node;
   b. means for generating a data cell having a meaning dependent upon the time when said cell passes from a first voltage state to a second voltage state and returns to said first voltage state, said time determined by said clock means;
   c. said data cell having the same meaning for a group of multiples of clock intervals and different meanings for different groups of multiples of clock intervals.

11. An apparatus according to claim 10, wherein said data cell is interpreted as having the same meaning for $n-1$, n, or $n+1$ 4 clock interval signals, wherein n is an integer multiple of 3.

12. An apparatus according to claim 11, wherein said data cell is interpreted as having a value of zero when $n=6$, a value of one when $n=3$, and said data cell indicating the start of a message when $n=9$.

13. An apparatus according to claim 10 for transmitting data asynchronously between data network nodes, which further comprises: elastic buffer means for receiving and elastically buffering data messages, comprised of said data cells.

14. A method for transmitting data asynchronously between data network nodes which comprises the steps of:
  a. generating a clock interval signal at each node;
  b. generating a data cell having a meaning dependent upon the time when said cell passes from a first voltage state to a second voltage state and returns to said first voltage state, said time determined by the number of clock interval signals;
  c. said data cell having the same meaning for a group of multiples of clock intervals and different meanings for different groups of multiples of clock intervals.

15. A method according to claim 14, wherein said data cell is interpreted as having the same meaning for $n-1$, n, or $n+1$ clock interval signals, wherein n is an integer multiple of 3.

16. A method according to claim 15, wherein said data cell is interpreted as having a value of zero when $n=6$, a value of one when $n=3$, and said data cell indicating the start of a message when $n=9$.

17. A method according to claim 14 for transmitting data asynchronously between data network nodes which further comprises the steps of receiving data messages comprised of said data cells, and elastically buffering said received messages.

18. A self-healing data network comprising:
  a. a plurality of nodes, each said node generating and receiving data signals asynchronously of said other nodes;
  b. a primary data pathway connecting said nodes;
  c. a secondary data pathway connecting said nodes;
  d. each said node including:
    (i) means for receiving signals from said data pathways,
    (ii) means for decoding said signals,
    (iii) means for storing said signals,
    (iv) means for determining the time interval between receipt of messages from said primary data pathway,
    (v) means for determining the time interval between receipt of messages from said secondary data pathway,
    (vi) means for encoding data signals,
    (vii) means for transmitting signals onto said data pathways,
    (viii) means for switching from transmitting signals on said primary data pathway to said secondary data pathway when said interval between receipt of said messages on said primary data pathway exceeds a preset value.

19. In a data network node, an integrated circuit comprising:

a. first means for decoding first data signals from a first data pathway,
  b. second means for decoding second data signals from a second data pathway,
  c. first means for storing said first data signals independent of phase of said first data signals,
  d. second means for storing said second data signals independent of phase of said second data signals,
  e. means for recognizing messages in said data signals independent of clocking external to said integrated circuit,
  f. means for switching between said first and second decoded data signals, said switching means providing an internal data stream,
  g. means for communicating said internal data stream to a host processor external to said integrated circuit,
  h. means for accepting commands from said hbst processor,
  i. first means for detecting a fault in said first data pathway, independent of sources external to said integrated circuit,
  j. second means for detecting a fault in said second data pathway, independent of sources external to said integrated circuit,
  k. said means for switching responsive to said first and said second fault detection means,
  l. first means for encoding said first data signals for said first data pathway,
  m. second means for encoding said second data signals for said second data pathway.

20. An integrated circuit according to claim 19, wherein said means for detecting a fault in said first data pathway and said means for detecting a fault in said second data pathway are each comprised of timer means for determining the time interval between receipt of said respective first and second data signals.

21. An integrated circuit according to claim 19, wherein said first storage means comprises a two-stage first-in-first-out including a plurality of registers.

22. An integrated circuit according to claim 19, wherein said second storage means comprises a state machine-controlled three stage first-in-first out.

23. An integrated circuit according to claim 19, wherein each of said first and second means for detecting a fault comprises a five-stage linear feedback shift register.

24. An integrated circuit as in claim 19, wherein said first and said second means for decoding each comprises a finite state machine of 22 states.

25. An integrated circuit according to claim 19, wherein said first and said second means for encoding each comprises a finite state machine of 18 states.

26. An integrated circuit according to claim 19, wherein said means for communicating with said host processor comprises a plurality of buses connecting a plurality of registers.

27. In a data network, self-healing network switching apparatus comprising:
  a. forward decoder means for decoding first data signals,
  b. reverse decoder means for decoding second data signals,
  c. forward timer means for determining the time interval between receipt of first data signals by said forward decoder means, d. reverse timer means for determining the time interval between receipt of second data signals by said reverse decoder means,
e. inswitch means for switching between said first data and second data signals, said inswitch means communicating with said forward decoder means and said reverse decoder means,
f. elastic buffer means for asynchronous storage of said second data signals, said elastic buffer means communicating with said reverse decoder means,
g. reverse encoder means for encoding said second data signals, said reverse encoder means communicating with said elastic buffer means,
h. forward encoder means for encoding processed data signals,
i. outswitch means for switching between said processed and said second data signals,
j. heal control means for altering the positions of said inswitch means and said outswitch means, said heal control means communicating with said forward timer means and said reverse timer means,
k. said inswitch positioned to communicate solely with said forward decoder means and pass said first data signals therethrough if said forward timer means time interval does not exceed a preset value,
l. said outswitch positioned to communicate solely with said reverse decoder means and pass said second data signals therethrough if said forward timer means time interval does not exceed a preset value,
m. said inswitch positioned by said heal control means with said reverse decoder to communicate with said reverse decoder means, and said outswitch means positioned by said heal control means to communicate with ground, if said forward timer time interval exceeds a preset value,
n. said outswitch positioned by said heal control means to communicate with said forward encoder means, if said reverse timer time interval exceeds a preset value,
o. said inswitch positioned by said heal control means to communicate with said reverse decoder means and said outswitch means positioned by said heal control means to communicate with ground, if said forward timer time interval and said reverse timer time interval each exceed their respective preset values.

* * * * *